(12) United States Patent
Ishida et al.

(10) Patent No.: US 8,507,091 B2
(45) Date of Patent: *Aug. 13, 2013

(54) METHOD OF REDUCING ODOR OF COMPOSITE RESIN PARTICLES, AND COMPOSITE RESIN PARTICLES

(75) Inventors: Shinji Ishida, Shiga (JP); Hideyasu Matsumura, Shiga (JP)

(73) Assignee: Sekisui Plastics Co., Ltd., Osaka (JP)

( * ) Notice: Subject to any disclaimer, the term of this patent is extended or adjusted under 35 U.S.C. 154(b) by 28 days.

This patent is subject to a terminal disclaimer.

(21) Appl. No.: 13/259,289

(22) PCT Filed: Mar. 24, 2010

(86) PCT No.: PCT/JP2010/055117
§ 371 (c)(1),
(2), (4) Date: Sep. 23, 2011

(87) PCT Pub. No.: WO2010/110336
PCT Pub. Date: Sep. 30, 2010

(65) Prior Publication Data
US 2012/0021220 A1    Jan. 26, 2012

(30) Foreign Application Priority Data

Mar. 26, 2009  (JP) ................ 2009-076626
Jan. 29, 2010  (JP) ................ 2010-019409

(51) Int. Cl.
*B32B 5/16*    (2006.01)

(52) U.S. Cl.
USPC ........................ 428/402; 528/491; 521/59

(58) Field of Classification Search
USPC .......................... 428/402; 528/491; 521/59
See application file for complete search history.

(56) References Cited

U.S. PATENT DOCUMENTS

| 6,031,070 | A  | * | 2/2000  | Billovits et al. ........ 528/491 |
| 8,084,510 | B2 | * | 12/2011 | Morioka et al. ......... 521/59  |
| 8,329,294 | B2 | * | 12/2012 | Ishida et al. ........... 428/402 |
| 2007/0048645 | A1 | | 3/2007 | Takashima et al. |

FOREIGN PATENT DOCUMENTS

| JP | 10-195129    | 7/1988  |
| JP | 2001-525884  | 12/2001 |
| JP | 2004-244529  | 9/2004  |
| JP | 2005-156586  | 6/2005  |
| JP | 2008-239910  | * 10/2008 |
| WO | 98/52978     | 11/1998 |

OTHER PUBLICATIONS

U.S. Appl. No. 13/259,301 to Hideyasu Matsumura et al., which was filed on Sep. 23, 2011.
Search report from International Application No. PCT/JP2010/055117, mail date is Apr. 20, 2010.
Extended European Search Report issued with respect to European Application No. 10756133.4, dated Jul. 26, 2012.

* cited by examiner

*Primary Examiner* — Leszek Kiliman
(74) *Attorney, Agent, or Firm* — Greenblum & Bernstein, P.L.C.

(57) ABSTRACT

A method of reducing an odor of composite resin particles comprising the step of:
fluidizing the composite resin particles, which contain a polyolefin-based resin and a polystyrene-based resin and which are used for producing an expanded molded article, in a container with a gas that is blown thereinto from its bottom and that has a temperature of (T−40)° C. to (T−10)° C. (T is a softening temperature of the composite resin particles), to reduce the odor generated from a raw material of the composite resin particles and generated according to a method of the composite resin particles,
wherein the composite resin particles whose odor is reduced are impregnated with a blowing agent; and the resultant is pre-expanded and then subject to an in-mold forming to make the expanded molded article have an odor strength of 3 or less in average value in odor test in which odor of an isovaleric acid diluted 100000 times is defined as 3, which means a reference odor, within 0 to 5 levels of the odor strength.

18 Claims, 9 Drawing Sheets

US 8,507,091 B2

METHOD OF REDUCING ODOR OF COMPOSITE RESIN PARTICLES, AND COMPOSITE RESIN PARTICLES

TECHNICAL FIELD

The present invention relates to a method of reducing odor of composite resin particles, and to the composite resin particles having reduced odor that are obtained by this method. More specifically, the present invention relates to a method of reducing odor of the composite resin particles containing a polyolefin-based resin and a polystyrene-based resin, and to the composite resin particles obtained by this method.

BACKGROUND

It has conventionally been known that a polystyrene-based resin expanded molded article obtained by forming polystyrene-based resin pre-expanded particles in a mold is excellent in rigidity, heat insulating property, lightweight property, water-resistant property, and expansion moldability. However, the expanded molded article has a drawback of being poor in chemical resistance and impact resistance. The expanded molded article also has a drawback of generating much odor, which makes it difficult to apply the expanded molded article to a usage of an interior of an automobile.

On the other hand, it has been known that an expanded molded article made of the polyolefin-based resin has reduced odor, and is excellent in chemical resistance and impact resistance. Therefore, the expanded molded article is used for automobile-related components. However, since the polyolefin-based resin is poor in a retention capacity of a blowing gas, an expansion molding condition has to be precisely controlled, which entails a problem of an increased production cost. Additionally, the expanded molded article made of the polyolefin-based resin also has a drawback of being poor in rigidity, compared to a styrene-based resin expanded molded article.

In view of the circumstance described above, an expanded molded article having excellent chemical resistance and rigidity has been produced from composite resin particles containing the polystyrene-based resin and the polyolefin-based resin, so that wherein the drawbacks of both the polystyrene-based resin expanded molded article and the polyolefin-based resin expanded molded article are overcome. However, such expanded molded article described above is still required to have a lower level of odor content, when used for automobile-related components (in particular, an interior material of an automobile).

It has been found that the odor is generated from a raw material of the composite resin particles or generated according to a production method thereof. Therefore, there is a method of reducing odor through a treatment after the production of the composite resin particles, in order to reduce the odor. For example, Japanese Unexamined Patent Application No. HEI 10 (1998)-195129 (Patent Document 1) discloses a method of reducing a volatile component such as an unreacted monomer from polystyrene-based polymer particles.

This document describes that a drying process is performed at a drying temperature of 200° C. or less until the ratio of the volatile component to be reduced falls to 20 wt. % or less, but this document does not relate to a method of reducing odor.

PRIOR ART DOCUMENT

Patent Document

Patent Document 1: Japanese Unexamined Patent Application No. HEI 10 (1998)-195129

SUMMARY OF INVENTION

Problems to be Solved by the Invention

Generally, in order to efficiently reduce odor contained in resin particles, it is only necessary to dry the resin particles at an increased temperature. However, when the temperature is increased too high, the resin particles might be bonded each other.

Therefore, there has been a demand for a method of efficiently reducing odor from the composite resin particles containing a polyolefin-based resin and a polystyrene-based resin, in order to utilize for a usage (e.g., an interior material of an automobile) that needs odor content percentage at a lower level.

Means for Solving the Problem

The inventors of the present invention made an extensive study that the composite resin particles containing the polyolefin-based resin and the polystyrene-based resin are fluidized in a container with a gas that was blown thereinto from its bottom and that had a temperature of $(T-40)°$ C. to $(T-10)°$ C. (T is a softening temperature of the composite resin particles) to solve the problems described above, and as a result, the inventors found that the odor, which was different from a volatile organic compound (VOC) and which was generated from the raw material of the composite resin particles and generated according to the production method thereof, could efficiently and surprisingly be reduced, resulting in the completion of the present invention.

The present invention provides a method of reducing an odor of composite resin particles comprising the step of:

fluidizing the composite resin particles, which contain a polyolefin-based resin and a polystyrene-based resin and which are used for producing an expanded molded article, in a container with a gas that is blown thereinto from its bottom and that has a temperature of $(T-40)°$ C. to $(T-10)°$ C. (T is a softening temperature of the composite resin particles), to reduce the odor generated from a raw material of the composite resin particles and generated according to a method of the composite resin particles, wherein the composite resin particles whose odor is reduced are impregnated with a blowing agent; and the resultant is pre-expanded and then subject to an in-mold forming to make the expanded molded article have an odor strength of 3 or less in average value in odor test in which odor of an isovaleric acid diluted 100000 times is defined as 3, which means a reference odor, within 0 to 5 levels of the odor strength.

The present invention also provides composite resin particles having reduced odor that are obtained by the method described above.

The present invention also provides composite resin particles comprising, for producing an expanded molded article, the composite resin particles containing 100 parts by weight of a polyolefin-based resin and 100 to 500 parts by weight of a polystyrene-based resin, wherein the composite resin particles:

(1) have a co-continuous structure or a granular dispersion structure in which an average area occupied by the polystyrene-based resin is 35 to 80 μm² in a TEM photograph obtained by photographing a portion of 10 μm×10 μm of a cross-section surface at its central part with a magnification of 12800; and (2) are impregnated with a blowing agent; and the resultant is pre-expanded and then subject to an in-mold forming to make the expanded molded article have an odor strength of 3 or less in average value in odor test in which odor of an isovaleric acid diluted 100000 times is defined as 3, which means a reference odor, within 0 to 5 levels of the odor strength.

The present invention also provides expandable composite resin particles formed by impregnating a blowing agent into the composite resin particles.

The present invention also provides pre-expanded particles formed by pre-expanding the expandable composite resin particles.

The present invention also provides an expanded molded article having an odor strength of 3 or less in an average value in the odor test, which is formed from the above-described pre-expanded particles subjected to an in-mold forming.

The present invention further provides an automobile interior material derived from the expanded molded article described above.

Effect of the Invention

The present invention can provide composite resin particles, the expandable resin particles, and the pre-expanded particles that have reduced odor and contain a polyolefin-based resin and a polystyrene-based resin. As a result, the present invention can provide an expanded molded article that can be utilized for a usage for an automobile interior that needs odor content percentage at lower levels than a conventional amount.

In the case where the polyolefin-based resin is a polyethylene-based resin, the composite resin particles having more reduced odor can be obtained by fluidizing particles with a gas having a temperature of (T−30)° C. to (T−10)° C.

In the case where the polyolefin-based resin is a polypropylene-based resin, the composite resin particles having more reduced odor can be obtained by fluidizing particles with a gas having a temperature of (T−40)° C. to (T−15)° C.

In the case where the composite resin particles are put into a container with a gas being blown thereinto from its bottom, the composite resin particles having more reduced odor can be obtained.

In the case where the composite resin particles contain 100 parts by weight of polyolefin-based resin and 100 to 500 parts by weight of polystyrene-based resin, the composite resin particles having more reduced odor and having excellent impact resistance and chemical resistance can be obtained.

In the case where the composite resin particles are polyolefin-modified styrene-based resin particles that are obtained by impregnating a styrene-based monomer into polyolefin-based resin particles and performing a polymerization, the composite resin particles having more reduced odor and having excellent impact resistance and chemical resistance can be obtained.

When odor is generated from a polymerization initiator used for producing a polystyrene-based resin forming a composite resin, the odor can be reduced by a method of the present invention.

The present invention can also provide composite resin particles for producing an expanded molded article, the composite resin particles containing 100 parts by weight of a polyolefin-based resin and 100 to 500 parts by weight of a polystyrene-based resin, wherein the composite resin particles:

(1) have a co-continuous structure or a granular dispersion structure in which an average area occupied by the polystyrene-based resin is 35 to 80 μm² in a TEM photograph obtained by photographing a portion of 10 μm×10 μm of a cross-section surface at its center part with a magnification of 12800; and (2) are impregnated with a blowing agent; and the resultant is pre-expanded and then subject to an in-mold forming to make the expanded molded article have an odor strength of 3 or less in average value in odor test in which odor of an isovaleric acid diluted 100000 times is defined as 3, which means a reference odor, within 0 to 5 levels of the odor strength, as a result, the composite resin particles having a structure capable of reducing odor can be obtained.

In the case where the composite resin particles have a co-continuous structure in which a band made of a polystyrene-based resin having 0.2 to 1.5 μm in average width is continuous having, or have a granular dispersion structure having a granular polystyrene-based resin of 0.01 to 1.5 μm in average width, the composite resin particles having a structure capable of reducing more odor can be obtained.

PREFERRED EMBODIMENTS OF THE INVENTION

Figure 1:
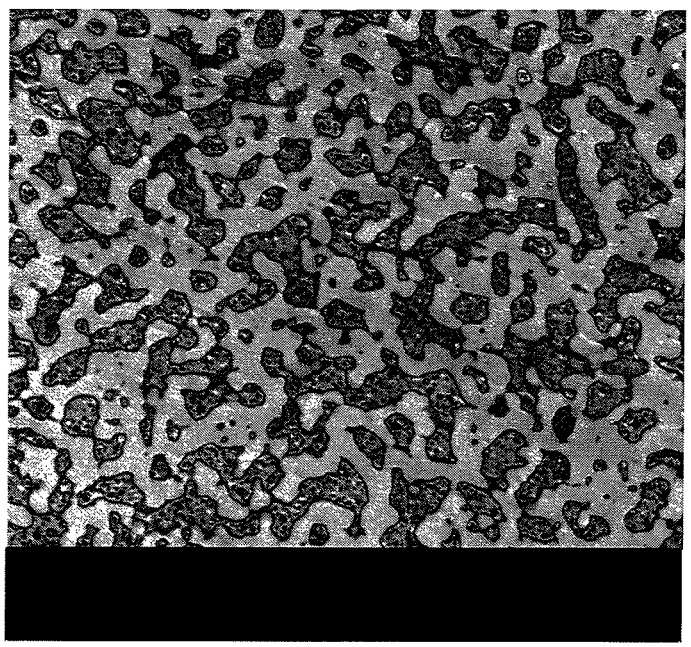
FIG. 1 is a photograph of a cross-section surface of a modified styrene-based resin particle according to an Example 1.

A method of reducing odor in composite resin particles containing a polyolefin-based resin and a polystyrene-based resin is a method of reducing odor, which is generated from a raw material of the composite resin particles and generated according to a method thereof, by fluidizing the composite resin particles containing the polyolefin-based resin and the polystyrene-based resin in a container with a gas that is blown thereinto from its bottom and that has a temperature of $(T-40)°$ C. to $(T-10)°$ C. (T is a softening temperature of the composite resin particles), wherein an average value of odor strength of an expanded molded article, which is formed from the composite resin particles having the reduced odor, becomes 3 or less in odor test in which odor of an isovaleric acid diluted 100000 times is defined as 3, which means a reference odor, within 0 to 5 levels of the odor strength.

In the present invention, the odor is generated from the raw material of the composite resin particles or from the production method thereof, but is different from a volatile organic compound (VOC). At present, the odor is considered to be the one derived from a polymerization initiator used for producing the polystyrene-based resin forming the composite resin, e.g., is considered to be its decomposition product.

In the present invention, the gas is blown from the bottom part of the container so as to fluidize the composite resin particles, resulting in that the odor can efficiently be reduced. The gas includes air, inert gas (e.g., nitrogen), and the like, wherein air is generally used.

(Odor Reducing Condition)

The container used in the present invention is a container that can allow the particles therein to fluidize with the gas blown from the bottom part of the container. The shape of the container is not particularly limited, so long as the container has a gas blowing port at its bottom part. The container usually has at its top part an exhaust port for exhausting the blown gas. It is preferable that a grating plate for preventing the composite resin particles from entering the blowing port is provided to the bottom part of the container. The grating plate is generally formed with a great number of holes through which the gas can pass. Each of the holes may have a shape by which the gas is vertically blown up, or a shape by which the gas is obliquely blown up. From the viewpoint of enhancing the reduction efficiency of the odor, the grating plate formed with the holes having the respective shapes is preferably used. A stirring device may be provided in the container in order to enhance the odor reducing effect.

As the container described above, a fluidized-bed dryer, which is generally used for drying granular materials, can be used. Specifically, a bag filter built-in turning fluid-bed dryer (e.g., SLIT FLOW (registered trademark) (FBS type) by Okawara Mfg. Co., Ltd.) can be used.

In the method according to the present invention, the composite resin particles may be put into the container before the gas is blown from the bottom part of the container, or may be put into the container with the gas being blown from the bottom part of the container. It is preferable that the composite resin particles are put into the container with the gas being blown from the bottom part of the container, from the viewpoint of enhancing the odor reducing efficiency.

The gas used in the present invention has the temperature of $(T-40)°$ C. to $(T-10)°$ C., when the softening temperature of the composite resin particles is defined as $T°$ C. When the temperature is lower than $(T-40)°$ C., the reduction of the odor might sometimes be insufficient. When the temperature exceeds $(T-10)°$ C., the composite resin particles may be bonded to each other. More preferable temperature of the gas is $(T-35)°$ C. to $(T-10)°$ C. The softening temperature here means a penetration temperature described in JIS K7196.

The gas flow rate is set to be not less than the minimum flow rate needed to fluidize the composite resin particles in the container, and it can be varied according to the particle size and the amount of the composite resin particles in the container.

The gas flow rate can be varied by a gas flow volume, wherein the fluidity can be adjusted by adjusting the gas flow volume. When the gas flow volume is small, there may be the case in which the gas cannot allow the composite resin particles to sufficiently fluidize. When the gas flow volume is great, the gas might scatter the composite resin particles. There is an appropriate flow volume range in order to allow the composite resin particles to efficiently fluidize. The preferable range is within 0.5 to 2.0 m/sec., and more preferable range is within 0.7 to 1.6 m/sec. The appropriate flow volume can be determined by a pressure loss received when the blowing gas passes through the composite resin particles. The pressure loss preferably falls within a range of 1 to 10 kPa, and more preferably, falls within a range of 2 to 6 kPa. If the pressure loss of the gas due to the resin falls within this range, the gas can surely allow the composite resin particles to fluidize.

The time taken for blowing the gas varies according to the temperature and the flow rate of the gas. When the temperature of the gas is constant, the time becomes short if the flow rate increases, while the time becomes long if the flow rate decreases. On the other hand, in case where the flow rate of the gas is constant, the time becomes short when the temperature increases, while the time becomes long when the temperature decreases. In either case, gas is blown until the average value of the odor strength of the odor contained in the expanded molded article formed from the composite resin particles becomes 3 or less in the odor test in which odor of an isovaleric acid diluted 100000 times is defined as 3, which means a reference odor, within 0 to 5 levels of the odor strength.

The odor test in the present invention is carried out by at least five professional or experienced odor test panelists (who determine whether odor is present or not with his/her sense of smell, e.g., licensed smell examiner). The panelists smell odor of an isovaleric acid diluted 100000 times, and set this odor as a reference odor (odor strength of 3 within levels of 0 to 5). The odor stronger than this reference odor (very strong odor) is specified as the odor strength of 5, the odor slightly stronger than this reference odor (strong odor) is defined as the odor strength of 4, the odor same as the reference odor (the odor easy to be sensed) is defined as the odor strength of 3, the odor slightly weaker than the reference odor (weak odor, i.e., a person can find what this odor is) is defined as the odor strength of 2, the odor weaker than the reference odor (the odor that can barely be sensed) is defined as the odor strength of 1, and the odor-free case is defined as the odor strength of 0. The average value is obtained from the odor strengths of at least these five panelists.

(Composite Resin Particles)

The composite resin containing the polyolefin-based resin and the polystyrene-based resin means a resin containing the polyolefin-based resin and the polystyrene-based resin mixed uniformly or non-uniformly.

The polyolefin-based resin is not particularly limited, and any known resins can be employed. The polyolefin resin may be cross-linked. Examples of the polyolefin-based resin include a polyethylene-based resin such as a branched low-density polyethylene, linear low-density polyethylene, medium-density polyethylene, high-density polyethylene, ethylene-vinyl acetate copolymer, ethylene-methylmethacrylate copolymer, and cross-linked body of these copolymers; and a polypropylene-based resin such as a propylene homopolymer, propylene-vinyl acetate copolymer, ethylene-propylene random copolymer, propylene-1-butene copolymer, and ethylene-propylene-butene random copolymer. In the illustrated examples described above, the low density is preferably within a range of 0.91 to 0.94 g/cm$^3$, and more preferably within a range of 0.91 to 0.93 g/cm$^3$. The high density is preferably within a range of 0.95 to 0.97 g/cm$^3$, and more preferably within a range of 0.95 to 0.96 g/cm$^3$. The medium density falls between the low density and the high density.

The polystyrene-based resin may be a polystyrene, or a copolymer of a styrene as a main component and other monomer copolymerizable with the styrene. The main component means that the styrene occupies 70 wt. % or more of the whole monomer. Examples of the other monomers include α-methylstyrene, p-methylstyrene, acrylonitrile, methacrylonitrile, acrylic acid, methacrylic acid, alkyl acrylate, alkyl methacrylate, divinylbenzene, and polyethylene glycol dimethacrylate. In the illustrated examples, the alkyl means the one having a carbon number of 1 to 8.

Preferable examples of the polyethylene-based resin include a branched low-density polyethylene, linear low-density polyethylene, and ethylene-vinyl acetate copolymer. Preferable examples of the polypropylene-based resin include ethylene-propylene random copolymer. Preferable examples of the polystyrene-based resin include polystyrene, styrene-alkyl acrylate copolymer, or styrene-alkyl methacrylate copolymer.

The polystyrene-based resin is contained in the composite resin within a range of 100 to 500 parts by weight with respect to 100 parts by weight of the polyolefin-based resin. The amount of a styrene-based monomer, which is a raw material of the polystyrene-based resin, with respect to 100 parts by weight of the polyolefin-based resin is also 100 to 500 parts by weight, like the polystyrene-based resin.

When the contained amount of the polystyrene-based resin exceeds 500 parts by weight, a crack resistance of the expanded molded article might be deteriorated. On the other hand, the contained amount of the polystyrene-based resin is less than 100 parts by weight, the crack resistance is significantly enhanced, but the dissipation of the blowing agent from the surface of the expandable resin particles tends to increase. Therefore, the expandable period (beads life) of the expandable resin particles might be decreased due to the deterioration in the retainability of the blowing agent. More preferable contained amount of the polystyrene-based resin is 100 to 400 parts by weight, and most preferable contained amount is 150 to 400 parts by weight.

The resin obtained by simply mixing both resins can be employed for the composite resin, but a polyolefin-modified styrene-based resin described later (sometimes referred to as a modified styrene-based resin, according to need) is preferable. More preferable composite resin is a polyethylene-modified styrene-based resin or a polypropylene-modified styrene-based resin.

The particles of the polyolefin-modified styrene-based resin (sometimes referred to as modified resin particles) can be obtained by adding a styrene-based monomer into an aqueous medium, in which the polyolefin-based resin particles are dispersed and retained, and by performing the polymerization. The production method of the composite resin particles will be described below.

The polyolefin-based resin particles can be obtained by a known method. For example, an olefin-based resin is subject to a melt extrusion with the use of an extruder, and then, palletized by an underwater cut or strand cut, whereby the polyolefin-based resin particles can be formed. The shape of the used polyolefin-based resin particles is generally a sphere, elliptic sphere (egg-shape), cylinder, rectangular cylinder, pellet, or granular shape. The polyolefin-based resin particles are sometimes referred to as a micropellet below.

The polyolefin-based resin may contain a cell adjusting agent such as talc, calcium silicate, calcium stearate, silicon dioxide produced by a synthesis or naturally produced, ethylene bis-stearic acid amide, or methacrylate ester copolymer, a flame retardant such as triaryl isocyanurate 6 brominated compound, a coloring agent such as carbon black, iron oxide, or graphite.

Next, the micropellets are dispersed in an aqueous medium in a polymerization container, wherein the polymerization is performed with the styrene-based monomer being impregnated to the micropellets.

Examples of the aqueous medium include water, and mixed medium of water and aqueous solvent (e.g., alcohol). A solvent (plasticizer) such as toluene, xylene, cyclohexane, ethyl acetate, dioctyl phthalate, and tetrachloroethylene may be added to the styrene-based monomer.

The styrene-based monomer may be impregnated into the polyolefin-based resin particles as being polymerized, or may be impregnated before the start of the polymerization. It is preferable that the styrene-based monomer is impregnated as being polymerized. When the polymerization is performed after the impregnation, the polymerization of the styrene-based monomer is easy to occur in the vicinity of the surface of the polyolefin-based resin particles, and further, the styrene-based monomer, which is not impregnated into the polyolefin-based resin particles, might solely be polymerized to generate a lot of fine-grained polystyrene-based resin particles.

An oil-soluble radical polymerization initiator can be used for the polymerization of the styrene-based monomer. A polymerization initiator that is widely used for the polymerization of the styrene-based monomer can be used as the polymerization initiator. Examples of the polymerization initiator include an organic peroxide such as benzoyl peroxide, lauroyl peroxide, t-butylperoxy octoate, t-hexylperoxy octoate, t-butylperoxy benzoate, t-amylperoxy benzoate, t-butylperoxy pivalate, t-butylperoxy isopropylcarbonate, t-hexylperoxy isopropylcarbonate, t-butylperoxy-3,3,5-trimethyl cyclohexanoate, di-t-butylperoxy hexahydroterephthalate, 2,2-di-t-butylperoxy butane, di-t-hexylperoxide, and dicumyl peroxide; and azo compound such as azobisisobutylonitrile, azobisdimethyl valeronitrile. The oil-soluble radical polymerization initiators described above may be used solely, or plural initiators may be used together.

Various methods are considered as a method of adding the polymerization initiator into the aqueous medium in the polymerization container. For example, (a) a method in which the polymerization initiator is dissolved into the styrene-based monomer in a container different from the polymerization container, and the resultant styrene-based monomer is supplied to the polymerization container,
(b) a method in which the polymerization initiator is dissolved in the styrene-based monomer in some amount, a solvent such as isoparaffin, or a plasticizer to prepare a solution, and the resultant solution and the styrene-based monomer in a predetermined amount are simultaneously supplied into the polymerization container, and
(c) a method in which the polymerization initiator is dispersed in the aqueous medium to prepare a dispersion solution, and this dispersion solution and the styrene-based monomer are supplied into the polymerization container.

The polymerization initiator is preferably added in an amount of 0.02 to 2.0 wt. % with respect to the total used amount of the styrene-based monomer.

It is preferable that an aqueous radical polymerization inhibitor is dissolved in the aqueous medium. The aqueous radical polymerization inhibitor not only suppresses the polymerization of the styrene-based monomer on the surface of the polyolefin-based resin particles, but also prevents a simple polymerization of the styrene-based monomer floating in the aqueous medium, thereby being capable of reducing the generation of fine grains of the styrene-based resin.

A polymerization inhibitor that is dissolved in an amount of 1 g or more with respect to 100 g of water can be used as the aqueous radical polymerization inhibitor. Examples thereof include thiocyanate such as ammonium thiocyanate, zinc thiocyanate, sodium thiocyanate, potassium thiocyanate, and aluminum thiocyanate; nitrite such as sodium nitrite, potassium nitrite, ammonium nitrite, calcium nitrite, silver nitrite, strontium nitrite, cesium nitrite, barium nitrite, magnesium nitrite, lithium nitrite, and dicyclohexyl ammonium nitrite; sulfur containing water-soluble organic compound such as mercaptoethanol, monothiopropylene glycol, thioglycerol, thioglycolic acid, thiohydroacrylic acid, thiolactic acid, thiomalic acid, thioethanolamine, 1,2-dithioglycerol, and 1,3-dithioglycerol; ascorbic acid; and sodium ascorbate. Among these materials, nitrite is particularly preferable.

The preferable used amount of the aqueous radical polymerization initiator is 0.001 to 0.04 parts by weight with respect to 100 parts by weight of water in the aqueous medium.

A dispersant is preferably added to the aqueous medium. Examples of the dispersant include an organic dispersant such as partially saponified polyvinyl alcohol, polyacrylate, polyvinylpyrrolidone, carboxymethyl cellulose, and methyl cellulose; and inorganic dispersant such as magnesium pyrrolinate, calcium pyrrolinate, calcium phosphate, calcium carbonate, magnesium phosphate, magnesium carbonate, and magnesium oxide. The inorganic dispersant is preferable among these dispersants.

When the inorganic dispersant is used, a surfactant is preferably used together. Examples of the surfactant include sodium dodecylbenzenesulfonate, and sodium α-olefinsulfonate.

The shape and structure of the polymerization container is not particularly limited, so long as the container is conventionally used for the suspension polymerization of the styrene based monomer.

A shape of a stirring impeller is not particularly limited. Specific examples of the stirring impeller include a paddle impeller such as V-shaped paddle impeller, Pfaudler impeller, tilted paddle impeller, flat paddle impeller, and pull margin impeller; a turbine impeller such as a turbine impeller, and fan turbine impeller; a propeller impeller such as a marine propeller impeller. The paddle impeller is preferable in these impellers. The stirring impeller may be a single-stage type or multi-stage type. A baffle may be provided in the polymerization container.

The temperature of the aqueous medium when the styrene-based monomer is polymerized in the micropellets is not particularly limited, but it preferably falls within the range of −30 to +20° C. of the melting point of the used polyolefin-based resin. More specifically, the temperature preferably falls within the range of 70 to 150° C., and more preferably falls within the range of 80 to 145° C. The temperature of the aqueous medium may be constant, or increased in a stepwise manner during the period from the start to the end of the polymerization of the styrene-based monomer. When the temperature of the aqueous medium is increased, the temperature is preferably increased with the rate of temperature increase of 0.1 to 2° C./min.

When particles made of a crosslinked polyolefin-based resin are used, the cross-link may be formed before the impregnation of the styrene-based monomer, may be formed during the impregnation and polymerization of the styrene-based monomer in the micropellets, or may be formed after the impregnation and polymerization of the styrene-based monomer in the micropellets.

Examples of a cross-linking agent used for the cross-link of the polyolefin-based resin include an organic peroxide such as 2,2-di-t-butylperoxybutane, dicumylperoxide, and 2,5-dimethyl-2,5-di-t-butylperoxyhexane. The cross-linking agent may be used solely, or two or more cross-linking agents may be used together. The preferable used amount of the cross-linking agent is generally 0.05 to 1.0 part by weight with respect to 100 parts by weight of the polyolefin-based resin particles (micropellets).

Examples of a method of adding the cross-linking agent include a method of directly adding the cross-linking agent to the olefin-based resin particles, a method of adding the cross-linking agent after the cross-linking agent is dissolved into a solvent, a plasticizer, or the styrene-based monomer, and a method of adding the cross-linking agent after the cross-linking agent is dispersed in water. The method of adding the cross-linking agent after the cross-linking agent is dissolved in the styrene-based monomer is preferable among these methods.

The diameter of the composite resin particles is preferably about 0.2 to 2 mm, and more preferably 0.5 to 1.8 mm.

In the present invention, an internal structure of the composite resin particles by which the odor can more be reduced is also found. Specifically, it is the composite particles that contains 100 parts by weight of the polyolefin-based resin and 100 to 500 parts by weight of the polystyrene-based resin, and that has a co-continuous structure or a granular dispersion structure in which an average area occupied by the polystyrene-based resin component is 35 to 80 $\mu m^2$ in a TEM photograph that is obtained by photographing a portion of 10 $\mu m \times 10$ $\mu m$ at a cross-section surface of the particles at its center part with magnification of 12800. In this structure, the portion derived from the olefin-based resin component and the portion derived from the polystyrene-based resin component are mixed in the particles. The present inventors have found that, as a result, the exhaust of the odor, mainly present in the polystyrene-based resin component, to the outside of the particles is more accelerated, compared to particles not having the structure described above.

When the average area is less than 35 $\mu m^2$, the resin particles cannot highly be expanded. In this case, the expanded molded article cannot have a sufficient impact absorption property. When the average area is greater than 80 $\mu m^2$, the odor might not sufficiently be reduced. More preferable average area is 40 to 70 $\mu m^2$.

The composite resin particles also preferably have a co-continuous structure in which a band made of the polystyrene-based resin having an average width of 0.2 to 1.5 µm is continuous, or a granular dispersion structure in which the granular polystyrene-based resin having an average particle diameter of 0.01 to 1.5 µm is dispersed. The structure described above is the internal structure that can more reduce the odor. When the average width of the band made of the polystyrene-based resin is less than 0.2 µm, or when the average diameter of the granular polystyrene-based resin is less than 0.01 µm, the composite resin particles that can impart a sufficient impact resistance to the expanded molded article might not be obtained. When the width of the band made of the polystyrene-based resin is greater than 1.5 µm, or when the average diameter of the granular polystyrene-based resin is greater than 1.5 µm, the odor might not sufficiently be reduced. More preferable average width is within the range of 0.3 to 1.0 µm, and more preferable average particle diameter is within the range of 0.05 to 1.0 µm.

The composite resin particles having the above-mentioned structure can be obtained by the production method of the modified resin particles described above, for example.

(Expandable Composite Resin Particles)

The expandable composite resin particles can be obtained by impregnating the blowing agent into the composite resin particles having the reduced odor. The blowing agent can be impregnated by a known method. For example, the blowing agent can be impregnated during the polymerization in such a manner that the polymerization reaction is made in an airtight container, and the blowing agent is put into the container under pressure. The blowing agent can be impregnated after the completion of the polymerization in such a manner that the blowing agent is put into the airtight container under pressure.

Various known blowing agents can be used as the blowing agent. Examples of the blowing agent include propane, n-butane, isobutene, n-pentane, isopentane, industrial pentane, petroleum ether, cyclohexane, and cyclopentane, wherein these materials are used solely, or used in combination. Preferable materials among these materials are propane, n-butane, isobutene, n-pentane, isopentane, and cyclopentane.

The expandable composite resin particles can be obtained by a method (wet impregnation process) in which the blowing agent is impregnated into the composite resin particles in the aqueous medium, or a method (dry impregnation process) in which the blowing agent is impregnated without using a medium. Examples of the aqueous medium include water, and a mixture solvent of water and aqueous medium (e.g., alcohol).

The aqueous medium may contain a surfactant. Examples of the surfactant include anion surfactant, and nonion surfactant.

Examples of the anion surfactant include alkyl sulfonate, alkylbenzene sulfonate, and alkyl phosphate, wherein alkylbenzene sulfonate is more preferable. Sodium dodecylbenzenesulfonate is more preferable.

Examples of the nonion surfactant include a surfactant having an HLB value of 7 or less, such as polyoxyethylene alkylamine (e.g., polyoxyethylene laurylamine, etc.), polyethylene glycol fatty acid ester, alkyldiethanol amide, alkyldiethanol amine, alkylmonoethanol amine, and polyalkylene glycol derivative. Among these materials, preferable materials are polyoxyethylene alkylamine, alkyldiethanol amine, and alkylmonoethanol amine, having a carbon number of 8 to 18, more preferably alkyl of 11 to 13, and more preferable material is polyoxyethylene laurylamine.

(Pre-Expanded Particles and Expanded Molded Article)

Next, a method of preparing pre-expanded particles and an expanded molded article from the expandable composite resin particles will be described.

The expandable composite resin particles are heated with the use of a heating medium such as steam, according to need, so as to be pre-expanded to have a predetermined bulk density, whereby the pre-expanded particles can be prepared.

The pre-expanded particles preferably have a bulk expansion ratio of 5 to 60 (bulk density of 0.016 to 0.2 g/cm$^3$). More preferably, the pre-expanded particles have a bulk expansion ratio of 10 to 55. When the bulk expansion ratio is greater than 60, the closed cell content of the pre-expanded particles is reduced, whereby the strength of the expanded molded article obtained by expanding the pre-expanded particles might be deteriorated. On the other hand, the bulk expansion ratio is less than 5, the weight of the expanded molded article obtained by expanding the pre-expanded particles might be increased.

The pre-expanded particles are filled in a mold of a molding machine, and are heated to be subject to a secondary expanding, so as to be integrally fused and bonded to each other. Thus, the expanded molded article having a desired shape can be produced. An EPS molding machine, which is used for producing an expanded molded article from the polystyrene-based resin pre-expanded particles, can be used as the molding machine.

The obtained expanded molded article can be used for a buffer material (cushioning material) for home electronics, a transport container for electronic devices, various industrial materials, or foods, and automobile-related components (e.g., an impact energy absorbing material such as a core material of a vehicle bumper, or a buffer material of an interior of a door). Since the expanded molded article having reduced odor is obtained, i.e., since the expanded molded article in which the average value of the odor strength in the odor test is 3 or less is obtained, the expanded molded article is well adaptable to an interior material of an automobile (e.g., lower-leg impact absorbing member or a floor raising member, tool box, etc.).

EXAMPLE

The present invention will be further described with reference to Examples, but the invention is not limited by these Examples. Various measurement processes and production conditions described in the Examples will be described below.

<Odor Test>

The odor test is carried out by five professional or experienced licensed smell examiners.

A person who is certified to have a normal sense of smell according to a process of selecting a panelist in 2 using a reference odor in 1 is allocated as the panelist.

1. Reference Odor

Five types described below

TABLE 1

| No. | Name | Concentration (mass/mass %) |
|---|---|---|
| A | β-phenylethyl alcohol | $10^{-4.0}$ |
| B | methylcyclopentenolone | $10^{-4.5}$ |
| C | isovaleric acid | $10^{-5.0}$ |
| D | γ-undecalactone | $10^{-4.5}$ |
| E | skatole | $10^{-5.0}$ |

(Note)
The right block represents a ratio by weight with respect to odor-free liquid paraffin 2. Method of Selecting Panelist (1) Five test sheets (having a length of about 14 cm, and width of about 7 mm, and referred to as "odor sheet" below), each having any one of numbers 1 to 5 written thereon, are made as one set, wherein optional two odor sheets are impregnated into a reference odor liquid (one type) to a depth of about 1 cm from the tip end, while the remaining three sheets are impregnated into the odor-free liquid paraffin in the same manner.

(2) The one set including five odor sheets are provided to an examinee (must be 18 years old and over), and allows the examinee to select two odor sheets having the odor of the reference odor liquid with his/her sense of smell.

(3) The procedures of (1) and (2) are performed for five types of the reference odor liquids, and an examinee who makes a correct answer for all of the five types of the reference odor liquids is certified to have a normal sense of smell.

(4) An examinee has to take the above-mentioned test at intervals within five years (within three years for a person aged 40 and over), in order to confirm that he/she has a normal sense of smell.

The odor test is carried out as described below.

An expanded molded article produced in the Examples and Comparative Examples is put in a thermostatic oven having 55° C. for 1 hour, and then, taken out from the oven. Thereafter, the expanded molded article is left to stand at 23° C. for 24 hours.

Then, a plate-like test piece having a rectangular plane is cut in a size of 100 mm in length×100 mm in width×30 mm in thickness from the expanded molded article. The test piece is put into a stainless container of 160 mm in diameter×200 mm in depth with a cover. The stainless container having the test piece put therein is put into a thermostatic oven of 60° C. for 1 hour, and then, taken out from the oven. Thereafter, the resultant is left to stand at 23° C. for 30 minutes.

Next, the panelist smells the odor of isovaleric acid (manufactured by Daiichi Yakuhin Sangyo Ltd.) that is diluted 100000 times, wherein this odor is defined as the reference odor (3 within 0 to 5 levels of the odor strength).

Then, the cover of the stainless container is slightly opened, and the panelist smells the odor in the container. The odor (strong odor) stronger than the reference odor is defined as the odor strength of 5, the odor (slightly strong odor) slightly stronger than the reference odor is defined as the odor strength of 4, the odor (that is easy to be sensed) same as the reference odor is defined as the odor strength of 3, the odor slightly weaker than the reference odor (weak odor, i.e., a person can find what this odor is) is defined as the odor strength of 2, the odor weaker than the reference odor (the odor that can barely be sensed) is defined as the odor strength of 1, and the odor-free case is defined as the odor strength of 0. The average value is obtained from the odor strengths of these five panelists after the completion of the test. When the value is 3 or less, the tested expanded molded article is determined to be passed.

<Softening Temperature>

A softening temperature is measured in accordance with the method described in "Testing Method for Softening Temperature of Thermoplastics Film and Sheeting by Thermomechanical Analysis" in JIS K7196. Specifically, the modified polystyrene-based resin particles are thermally pressed at 180° C. for 5 minutes so as to form a plate-like molded article having a thickness of 3 mm. Then, a test piece of 5 mm in length×5 mm in width×3 mm in thickness is cut. A probe is put on the test piece in a penetrating test mode (tip end of the probe: ϕ1 mm) under a load of 500 mN with the use of an apparatus of measuring heat, stress and distortion (trade name "EXSTRAR TMA/SS6100" manufactured by SII Nano Technology Inc.), wherein the temperature is raised at a rate of temperature increase of 5° C./min. A linear portion recognized at the low-temperature side before the indenter (probe) starts to enter is extended to the high-temperature side in a TMA curve, and the intersection of an extension to the low-temperature side of a tangent line of the portion where the entering speed becomes the maximum is defined as a penetrating temperature, wherein the penetrating temperature is defined as the softening temperature of this resin particles.

When there are two penetrating temperature, the penetrating temperature on the high temperature side is the softening temperature.

<Pre-Expanding Condition>

The expandable resin particles are put into an atmospheric pre-expanding machine (SKK-70 manufactured by Sekisui Machinery Co., Ltd. or PSX40 manufactured by Kasahara Industries Co., Ltd.) that is preheated with steam. The expandable resin particles are stirred, while the steam is introduced to about 0.02 to 0.20 MPa and air is also supplied, whereby the expandable resin particles are expanded to have a predetermined bulk density (bulk expansion ratio) for about 2 to 3 minutes.

<In-Mold Forming Condition>

The pre-expanded particles are filled in a mold of the molding machine, and heated and cooled with steam under the condition described below. Thereafter, the pre-expanded particles are taken out from the mold.

Molding machine: ACE-11QS by Sekisui Machinery Co., Ltd.

Mold size: 400 mm (width)×300 mm (length)×30 mm (thickness)

Molding condition: total heating time: 50 seconds

Set steam pressure: 0.05 to 0.25 MPa

Cooling: until the surface pressure becomes 0.001 MPa or less

<Bulk Density and Bulk Expansion Ratio of Pre-Expanded Particles>

The pre-expanded particles are filled in a measuring cylinder up to a scale of 500 cm³. The measuring cylinder is visually confirmed from the horizontal direction, and when even one particle of the pre-expanded particles reaches the scale of 500 cm³, the filling of the pre-expanded particles into the measuring cylinder is ended at this point.

Next, the mass of the pre-expanded particles filled in the measuring cylinder is weighed down to the effective number at the second decimal place, and this mass is defined as W(g).

The bulk density of the pre-expanded particles is calculated according to an equation described below.

$$\text{Bulk density (g/cm}^3\text{)}=W/500$$

The bulk expansion ratio of the pre-expanded particles is calculated according to an equation described below.

$$\text{Bulk expansion ratio (time)}=1/\text{bulk density (g/cm}^3\text{)}.$$

<Density and Expansion Ratio of Expanded Molded Article>

The density and expansion ratio are measured in accordance with a method described in "Expanded plastics and rubbers—Determination of apparent density" in JIS K7222: 1999.

A test piece of 50 cm³ or more (100 cm³ or more in the case of a semihard or soft material) is cut in order not to change the original cell structure of the material, and its mass is measured. The density and expansion ratio are calculated according to an equation described below.

$$\text{Density (g/cm}^3\text{)}=\text{Mass of test piece (g)/Volume of test piece (cm}^3\text{)}$$

In terms of regulating the state of the test piece, the test piece for measurement is cut from a sample that has been left to stand for at least 72 hours from molding, and is subsequently left to stand for 16 hours or more under the environment condition of 23° C.±2° C.×50%±5% or 27° C.±2° C.×65%±5%.

The expansion ratio of the expanded molded article is calculated according to an equation described below.

Expansion ratio=1/density (g/cm³)

<Average Area, Average Width of Band Made of Polystyrene-Based Resin, Average Particle Diameter of Granular Polystyrene-Based Resin>

The composite resin particle is cut in order that the cross-section surface increases as much as possible. The portion of 10 μm×10 μm at the center of the cut section is photographed at magnification of 12800 with the use of a transmission electron microscope (TEM). The photograph is binarized by using image processing software (Nano Hunter NS2K-Pro/Lt by Nano System Corporation) in order to identify a PS portion and PE portion in the obtained photograph. By using the binarized view, the area of the PS portion to the total area is automatically calculated, whereby the area occupied by the polystyrene-based resin component is measured. The similar measurement is carried out for five composite resin particles, and the average value of the obtained areas is defined as an average area.

The width of the band made of the polystyrene-based resin and the particle diameter of the granular polystyrene-based resin present in the binarized view are measured by measuring distance between two points using the image processing software. The width and the particle diameter are measured at 10 points each, and the average values thereof are respectively defined as the average width and average particle diameter.

Example 1 a) Production of Modified Styrene-Based Resin Particles of Polyethylene-Based Resin (PE)/Polystyrene-Based Resin (PS)=40/60

100 parts by weight of ethylene-vinyl acetate copolymer (hereinafter referred to as EVA) (trade name: "LV-115" by Japan Polyethylene Corporation, melting point: 108° C., melt flow rate: 0.3 g/10 minutes) serving as the polyethylene-based resin, and 0.5 part by weight of synthetic hydrous silicon dioxide were fed to an extruder so as to be fused and mixed to perform in a granulation with an underwater cut process, whereby EVA resin particles having an elliptic shape (egg shape) (polyolefin-based resin particles) were prepared. The average weight of the EVA resin particles was 0.6 mg.

Next, 128 g of magnesium pyrrolinate, and 32 g of sodium dodecylbenzenesulfonate were dispersed into 40 kg of water, to prepare a dispersion medium.

16 kg of the EVA resin particles containing the synthetic hydrous silicon dioxide were dispersed into the dispersion medium so as to prepare a suspension.

12.2 g of t-butylperoxy benzoate serving as the polymerization initiator was dissolved into 6.4 kg of styrene monomer to prepare a first styrene-based monomer.

The temperature of the suspension containing the EVA resin particles was adjusted to be 60° C., and the first styrene-based monomer was added for 30 minutes in a constant rate. The resultant was then stirred for 1 hour in order to impregnate the first styrene-based monomer into the EVA resin particles.

Then, the temperature of the reaction system was raised to 130° C., which was higher than the melting point of the EVA by 23° C., and the resultant was held for 3 hours with this state, whereby the styrene monomer was polymerized (first polymerization) into the EVA resin particles.

Next, the temperature of the reaction system was decreased to 90° C., and a second styrene-based monomer obtained by dissolving 33.4 g of t-butylperoxy benzoate and 88 g of dicumyl peroxide serving as the polymerization initiator into 17.6 kg of styrene monomer was continuously added dropwise at a ratio of 4.4 kg per 1 hour, whereby the second styrene-based monomer was polymerized (second polymerization) into the EVA resin particles as being impregnated therein.

After the dropwise addition was ended, the temperature was retained at 90° C. for 1 hour, and then, the temperature of the resultant was raised to 143° C. The resultant was retained for 3 hours with this state so as to complete the polymerization, whereby the modified styrene-based resin particles were prepared.

The softening temperature of the obtained modified styrene-based resin particles was 105° C.

Figure 2:
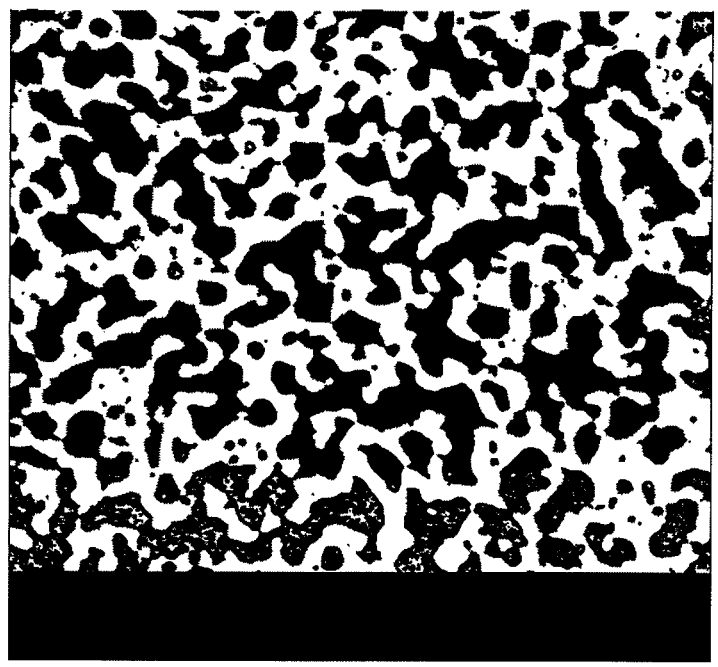
FIG. 2 is a view obtained by performing a binary process to FIG. 1.

FIGS. 1 and 2 are a photograph of the cross-section surface of the modified styrene-based resin particle, and its binarized view (×12800). The average area occupied by the polystyrene-based resin component in the modified styrene-based resin particles was 49.2 μm². The particles had a co-continuous structure in which a band made of the polystyrene-based resin was continuous, and the average width of the band was 0.5 μm.

b) Reduction of Odor

Subsequently, 70 kg of the modified styrene-based resin particles prepared by the process described above were put into an apparatus, that was a fluidized-bed dryer (model: SGD-3) manufactured by Okawara Mfg. Co., Ltd., in which a gas (air) having a temperature of 92° C. that was lower than the softening temperature T° C. of the modified styrene-based resin particles by 13° C. was blown up at a rate of 1.1 m/sec. from the bottom part, and were processed for 6 hours in order to reduce odor.

Then, the temperature was cooled to a room temperature, and the modified styrene-based resin particles were taken out from the fluid-bed dryer, whereby the modified styrene-based resin particles having the reduced odor were prepared.

c) Pre-Expanding

Subsequently, 100 parts by weight of the modified resin particles, 1.0 part by weight of water, 0.15 part by weight of monoglyceride stearate, and 0.5 part by weight of diisobutyl adipate were fed into a pressure-resistant V-shaped rotary mixer having an internal volume of 1 m³. 14 parts by weight of butane (n-butane:i-butane=7:3) was put therein under pressure at room temperature, as the mixer was rotated. The temperature in the rotary mixer was raised to 70° C., and held for 4 hours. Thereafter, the temperature was cooled to 25° C., whereby the expandable resin particles were prepared.

The obtained expandable resin particles were immediately fed to a pre-expanding machine (trade name: "SKK-70" manufactured by Sekisui Machinery Co., Ltd.), so as to be pre-expanded by using steam having a pressure of 0.02 MPa. Thus, pre-expanded particles having a bulk density of 0.033 g/cm³ were prepared.

d) Expansion Molding

Then, the pre-expanded particles were left to stand for 7 days at room temperature, and then, filled in a mold of a molding machine. Steam was supplied into the mold so as to expand the pre-expanded particles, whereby an expanded molded article was produced in which a density of a rectangular parallelepiped of 400 mm in length×300 mm in width× 30 mm in height was 0.033 g/cm$^3$. A fusion rate and appearance of the obtained expanded molded article were both satisfactory.

When the expanded molded article obtained as described above was subject to the odor test, the average odor strength was 2.4.

Table 2 shows the results of various measurements.

Example 2 a) Production of Modified Styrene-Based Resin Particles of Polyethylene-Based Resin (PE)/Polystyrene-Based Resin (PS)=50/50

100 parts by weight of ethylene-vinyl acetate copolymer (hereinafter referred to as EVA) (trade name: "LV-115" by Japan Polyethylene Corporation, melting point: 108° C., melt flow rate: 0.3 g/10 minutes) serving as the polyethylene-based resin, and 0.5 part by weight of synthetic hydrous silicon dioxide were fed to an extruder so as to be fused and mixed to perform a granulation with an underwater cut process, whereby EVA resin particles having an elliptic shape (egg shape) (polyolefin-based resin particles) were prepared. The average weight of the EVA resin particles was 0.6 mg.

Next, 128 g of magnesium pyrrolinate, and 32 g of sodium dodecylbenzenesulfonate were dispersed into 40 kg of water, to prepare a dispersion medium.

20 kg of the EVA resin particles containing the synthetic hydrous silicon dioxide were dispersed into the dispersion medium so as to prepare a suspension.

16.0 g of t-butylperoxy benzoate serving as the polymerization initiator was dissolved into 8.4 kg of styrene monomer to prepare a first styrene-based monomer.

The temperature of the suspension containing the EVA resin particles was adjusted to be 60° C., and the first styrene-based monomer was added for 30 minutes in a constant rate. The resultant was then stirred for 1 hour in order to impregnate the first styrene-based monomer into the EVA resin particles.

Then, the temperature of the reaction system was raised to 130° C., which was higher than the melting point of the EVA by 23° C., and the resultant was held for 3 hours with this state, whereby the styrene monomer was polymerized (first polymerization) into the EVA resin particles.

Next, the temperature of the reaction system was decreased to 90° C., and a second styrene-based monomer obtained by dissolving 28.0 g of t-butylperoxy benzoate and 110 g of dicumyl peroxide serving as the polymerization initiator into 11.6 kg of styrene monomer was continuously added dropwise at a ratio of 4.4 kg per 1 hour, whereby the second styrene-based monomer was polymerized (second polymerization) into the EVA resin particles as being impregnated therein.

After dropwise addition was ended, the resultant was retained at 90° C. for 1 hour, and then, the temperature of the resultant was raised to 143° C. The resultant was retained with this state for 3 hours so as to complete the polymerization, whereby the modified styrene-based resin particles were prepared.

The softening temperature of the obtained modified styrene-based resin particles was 103° C.

Figure 3:
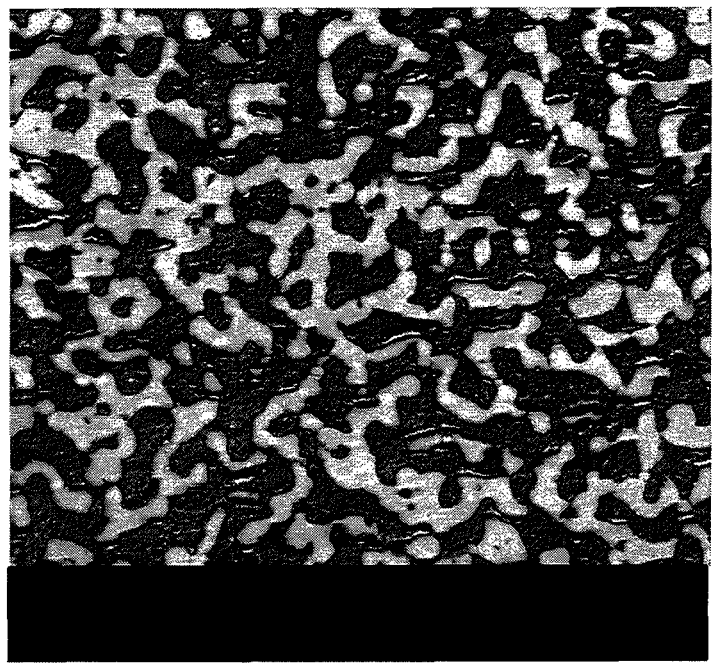
FIG. 3 is a photograph of a cross-section surface of a modified styrene-based resin particle according to an Example 2.
Figure 4:
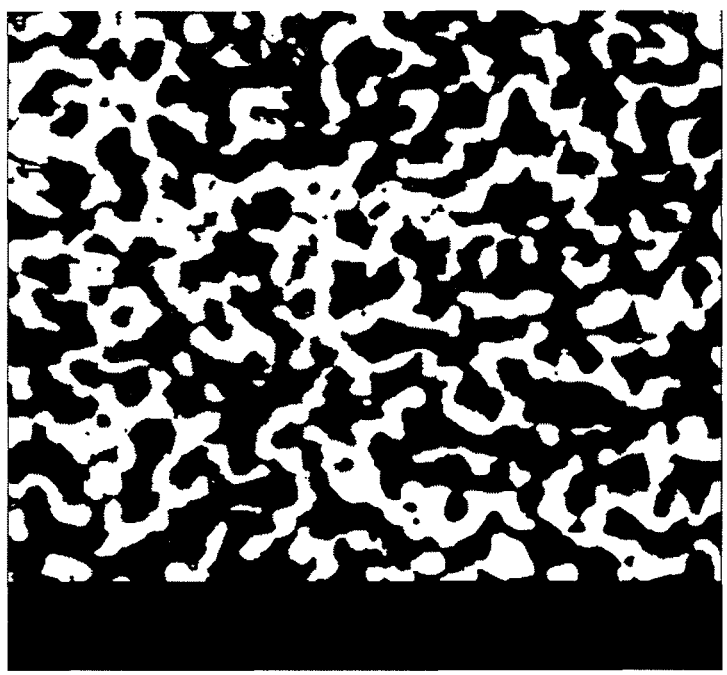
FIG. 4 is a view obtained by performing a binary process to FIG. 3.

FIGS. 3 and 4 are a photograph of the cross-section surface of the modified styrene-based resin particle, and its binarized view (×12800). The average area occupied by the polystyrene-based resin component in the modified styrene-based resin particle was 41.9 μm$^2$. This particle had a co-continuous structure in which a band made of the polystyrene-based resin was continuous, and the average width of the band was 0.4 μm.

b) to d) Reduction of Odor to Expansion Molding

The processes after the process a) were executed in the same manner as in Example 1.

The average odor strength of the expanded molded article was 2.2.

Table 2 shows the results of various measurements.

Example 3 a) Production of Modified Styrene-Based Resin Particles of Polyethylene-Based Resin (PE)/Polystyrene-Based Resin (PS)=30/70

100 parts by weight of ethylene-vinyl acetate copolymer (hereinafter referred to as EVA) (trade name: "LV-115" by Japan Polyethylene Corporation, melting point: 108° C., melt flow rate: 0.3 g/10 minutes) serving as the polyethylene-based resin, and 0.5 part by weight of synthetic hydrous silicon dioxide were fed to an extruder so as to be fused and mixed to perform a granulation with an underwater cut process, whereby EVA resin particles having an elliptic shape (egg shape) (polyolefin-based resin particles) were prepared. The average weight of the EVA resin particles was 0.6 mg.

Next, 128 g of magnesium pyrrolinate, and 32 g of sodium dodecylbenzenesulfonate were dispersed into 40 kg of water, to prepare a dispersion medium.

12 kg of the EVA resin particles containing the synthetic hydrous silicon dioxide were dispersed into the dispersion medium so as to prepare a suspension.

9.5 g of t-butylperoxy benzoate serving as the polymerization initiator was dissolved into 5.0 kg of styrene monomer to prepare a first styrene-based monomer.

The temperature of the suspension containing the EVA resin particles was adjusted to be 60° C., and the first styrene-based monomer was added for 30 minutes in a constant rate. The resultant was then stirred for 1 hour in order to impregnate the first styrene-based monomer into the EVA resin particles.

Then, the temperature of the reaction system was raised to 130° C., which was higher than the melting point of the EVA by 23° C., and the resultant was held for 3 hours with this state, whereby the styrene monomer was polymerized (first polymerization) into the EVA resin particles.

Next, the temperature of the reaction system was decreased to 90° C., and a second styrene-based monomer obtained by dissolving 39.2 g of t-butylperoxy benzoate and 66 g of dicumyl peroxide serving as the polymerization initiator into 23.0 kg of styrene monomer was continuously added dropwise at a ratio of 4.4 kg per 1 hour, whereby the second styrene-based monomer was polymerized (second polymerization) into the EVA resin particles as being impregnated therein.

After the dropwise addition was ended, the resultant was retained at 90° C. for 1 hour, and then, the temperature of the resultant was raised to 143° C. The resultant was retained with this state for 3 hours so as to complete the polymerization, whereby the modified styrene-based resin particles were prepared.

The softening temperature of the obtained modified styrene-based resin particles was 107° C.

Figure 5:
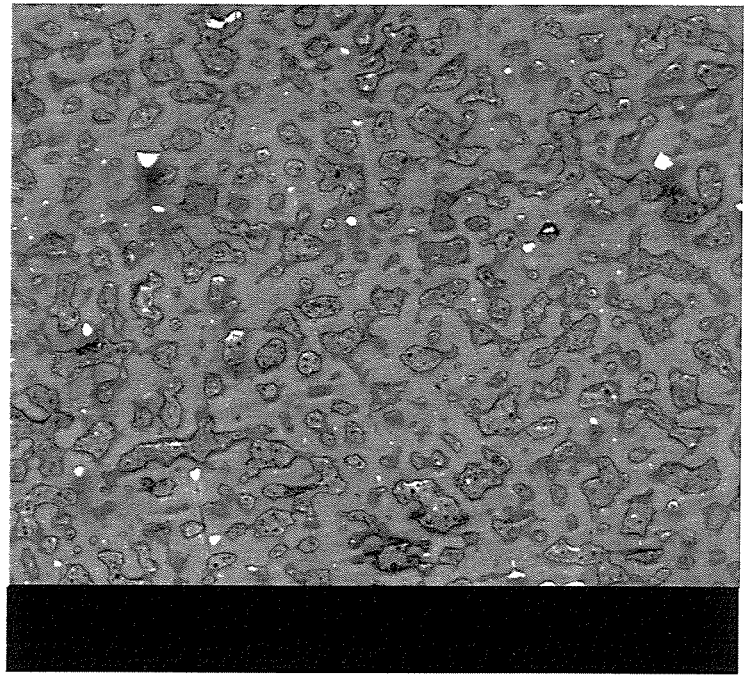
FIG. 5 is a photograph of a cross-section surface of a modified styrene-based resin particle according to an Example 3.
Figure 6:
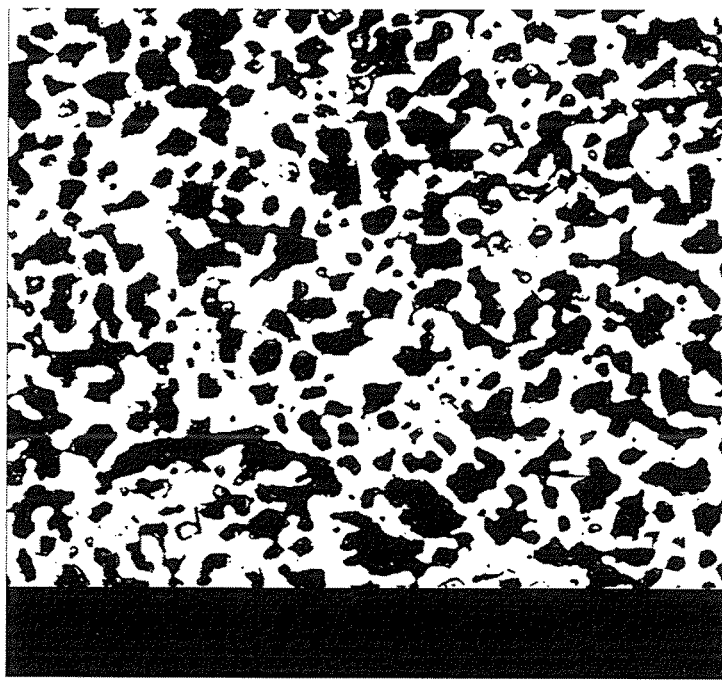
FIG. 6 is a view obtained by performing a binary process to FIG. 5.

FIGS. 5 and 6 are a photograph of the cross-section surface of the modified styrene-based resin particle, and its binarized view (×12800). The average area occupied by the polystyrene-based resin component in the modified styrene-based resin particle was 56.0 µm². This particle had a co-continuous structure in which a band made of the polystyrene-based resin was continuous, and the average width of the band was 0.6 µm.

b) to d) Reduction of Odor to Expansion Molding

The processes after the process a) were executed in the same manner as in Example 1.

The average odor strength of the expanded molded article was 2.5.

Table 2 shows the results of various measurements.

Example 4

An expanded molded article having a reduced odor was prepared in the same manner as in Example 1, except that, in order to reduce the odor, a fluidized-bed dryer (model: FB-0.5) manufactured by Okawara Mfg. Co., Ltd. was used, and 18 kg of modified styrene-based resin particles were put into the dryer in which a gas (air) having a temperature of 90° C. that was lower than the softening temperature T° C. of the modified styrene-based resin particles by 15° C. was blown up at a rate of 1.2 m/sec. from the bottom part, and were processed for 9 hours in order to reduce odor. When the expanded molded article obtained as described above was subject to the odor test, the average odor strength was 2.6.

Table 2 shows the results of various measurements.

Example 5

An expanded molded article having a reduced odor was prepared in the same manner as in Example 1, except that the processing time was set to 3 hours in order to reduce odor. When the expanded molded article obtained as described above was subject to the odor test, the average odor strength was 3.0.

Table 2 shows the results of various measurements.

Example 6

An expanded molded article having a reduced odor was prepared in the same manner as in Example 4, except that the processing temperature was set to 80° C., and the processing time was set to 12 hours in order to reduce odor. When the expanded molded article obtained as described above was subject to the odor test, the average odor strength was 3.0.

Table 2 shows the results of various measurements.

Example 7

After the first polymerization, the temperature of the reaction system was decreased to 115° C., and a second styrene-based monomer obtained by dissolving 84 g of dicumyl peroxide serving as the polymerization initiator into 11.6 kg of styrene monomer was continuously added dropwise at a ratio of 4.4 kg per 1 hour, whereby the second styrene-based monomer was polymerized (second polymerization) into the EVA resin particles as being impregnated therein.

After the dropwise addition was ended, the resultant was retained at 115° C. for 1 hour, and then, the temperature of the resultant was raised to 140° C. The resultant was retained with this state for 3 hours so as to complete the polymerization, whereby the modified styrene-based resin particles were prepared.

The softening temperature of the obtained modified styrene-based resin particles was 105° C.

Figure 7:
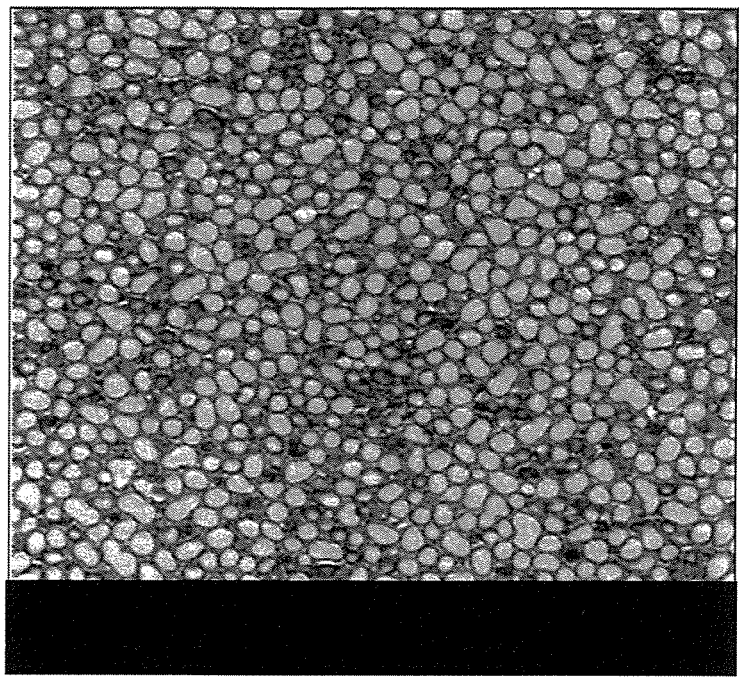
FIG. 7 is a photograph of a cross-section surface of a modified styrene-based resin particle according to an Example 7.
Figure 8:
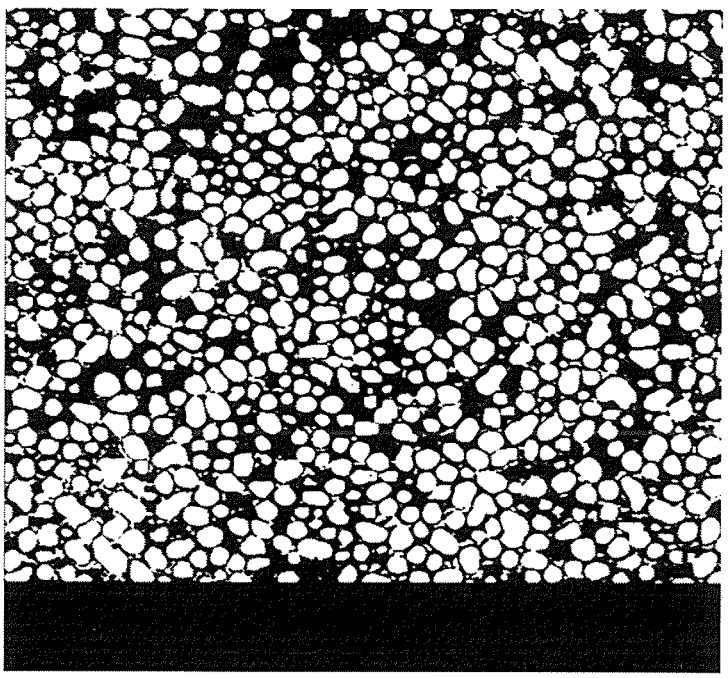
FIG. 8 is a view obtained by performing a binary process to FIG. 7.

FIGS. 7 and 8 are a photograph of the cross-section surface of the modified styrene-based resin particles, and its binarized view (×12800). The average area occupied by the polystyrene-based resin component in the modified styrene-based resin particles was 52.3 µm². The particles had a structure in which the particles of the polystyrene-based resin were dispersed, and the average particle diameter was 0.65 µM.

An expanded molded article was produced as in Example 1.

The average odor strength of the expanded molded article was 2.0.

Table 2 shows the results of various measurements.

Example 8 a) Production of Modified Styrene-Based Resin Particles of Polyethylene-Based Resin (PE)/Polystyrene-Based Resin (PS)=20/80

100 parts by weight of LLDPE (trade name: "NF-464A" by Japan Polyethylene Corporation, melting point: 124° C., melt flow rate: 2 g/10 minutes) serving as the polyethylene-based resin, and 0.5 part by weight of synthetic hydrous silicon dioxide were fed to an extruder so as to be fused and mixed to perform a granulation with an underwater cut process, whereby LLDPE resin particles having an elliptic shape (egg shape) (polyethylene-based resin particles) were prepared. The average weight of the LLDPE resin particles was 0.6 mg.

Next, 128 g of magnesium pyrrolinate, and 32 g of sodium dodecylbenzenesulfonate were dispersed into 40 kg of water, to prepare a dispersion medium.

8 kg of the LLDPE resin particles containing the synthetic hydrous silicon dioxide were dispersed into the dispersion medium so as to prepare a suspension.

7.6 g of t-butylperoxy benzoate serving as the polymerization initiator was dissolved into 4 kg of styrene monomer to prepare a first styrene-based monomer.

The temperature of the suspension containing the LLDPE resin particles was adjusted to be 60° C., and the first styrene-based monomer was added for 30 minutes in a constant rate. The resultant was then stirred for 1 hour in order to impregnate the first styrene-based monomer into the LLDPE resin particles.

Then, the temperature of the reaction system was raised to 135° C., which was higher than the melting point of the LLDPE by 11° C., and the resultant was held for 3 hours with this state, whereby the styrene monomer was polymerized (first polymerization) into the LLDPE resin particles.

Next, the temperature of the reaction system was decreased to 115° C., and a second styrene-based monomer obtained by dissolving 53.2 g of t-butylperoxy benzoate serving as the polymerization initiator into 28 kg of styrene monomer was continuously added dropwise at a ratio of 4.6 kg per 1 hour, whereby the second styrene-based monomer was polymerized (second polymerization) into the LLDPE resin particles as being impregnated therein.

After the dropwise addition was ended, the resultant was retained at 115° C. for 1 hour, and then, the temperature of the resultant was raised to 140° C. The resultant was retained with this state for 3 hours so as to complete the polymerization, whereby the modified styrene-based resin particles were prepared.

The softening temperature of the obtained modified styrene-based resin particles was 107° C.

Figure 9:
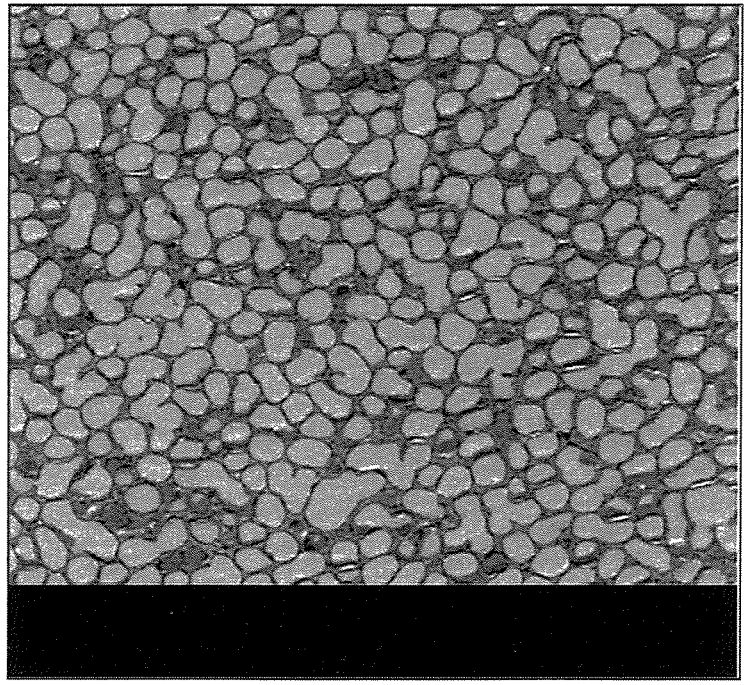
FIG. 9 is a photograph of a cross-section surface of a modified styrene-based resin particle according to an Example 8.
Figure 10:
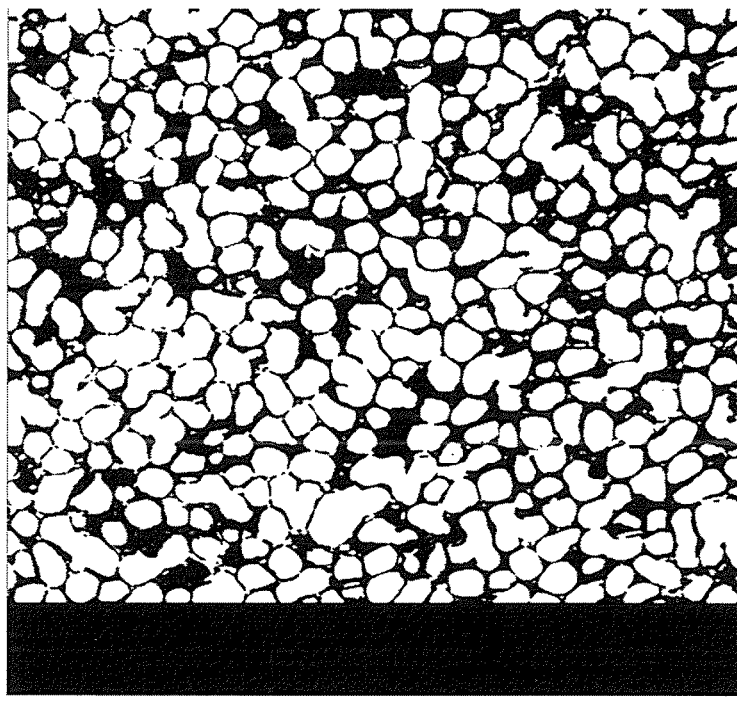
FIG. 10 is a view obtained by performing a binary process to FIG. 9.

FIGS. 9 and 10 are a photograph of the cross-section surface of the modified styrene-based resin particles, and its binarized view (×12800). The average area occupied by the polystyrene-based resin component in the modified styrene-based resin particles was 66.3 µm$^2$. The particles had a structure in which the particles of the polystyrene-based resin were dispersed, and the average particle diameter was 1.25 µm.

The thus obtained modified styrene-based resin particles were used, and an expanded molded article having a reduced odor was prepared in the same manner as in Example 4, except that the processing temperature was set to 92° C., and the processing time was set to 6 hours in order to reduce odor. When the expanded molded article obtained as described above was subject to the odor test, the average odor strength was 2.8.

Table 2 shows the results of various measurements.

Example 9 a) Production of Modified Styrene-Based Resin Particles of Polyethylene-Based Resin (PE)/Polystyrene-Based Resin (PS)=30/70

100 parts by weight of LLDPE (trade name: "NF-464A" by Japan Polyethylene Corporation, melting point: 124° C., melt flow rate: 2 g/10 minutes) serving as the polyethylene-based resin, and 0.5 part by weight of synthetic hydrous silicon dioxide were fed to an extruder so as to be fused and mixed to perform a granulation with an underwater cut process, whereby LLDPE resin particles having an elliptic shape (egg shape) (polyethylene-based resin particles) were prepared. The average weight of the LLDPE resin particles was 0.6 mg.

Next, 128 g of magnesium pyrrolinate, and 32 g of sodium dodecylbenzenesulfonate were dispersed into 40 kg of water, to prepare a dispersion medium.

12 kg of the LLDPE resin particles containing the synthetic hydrous silicon dioxide were dispersed into the dispersion medium so as to prepare a suspension.

11.4 g of t-butylperoxy benzoate serving as the polymerization initiator was dissolved into 6 kg of styrene monomer to prepare a first styrene-based monomer.

The temperature of the suspension containing the LLDPE resin particles was adjusted to be 60° C., and the first styrene-based monomer was added for 30 minutes in a constant rate. The resultant was then stirred for 1 hour in order to impregnate the first styrene-based monomer into the LLDPE resin particles.

Then, the temperature of the reaction system was raised to 135° C., which was higher than the melting point of the LLDPE by 11° C., and the resultant was held for 3 hours with this state, whereby the styrene monomer was polymerized (first polymerization) into the LLDPE resin particles.

Next, the temperature of the reaction system was decreased to 115° C., and a second styrene-based monomer obtained by dissolving 41.8 g of t-butylperoxy benzoate serving as the polymerization initiator into 22 kg of styrene monomer was continuously added dropwise at a ratio of 4.6 kg per 1 hour, whereby the second styrene-based monomer was polymerized (second polymerization) into the LLDPE resin particles as being impregnated therein.

After the dropwise addition was ended, the resultant was retained at 115° C. for 1 hour, and then, the temperature of the resultant was raised to 140° C. The resultant was retained with this state for 3 hours so as to complete the polymerization, whereby the modified styrene-based resin particles were prepared.

The softening temperature of the obtained modified styrene-based resin particles was 107° C.

Figure 11:
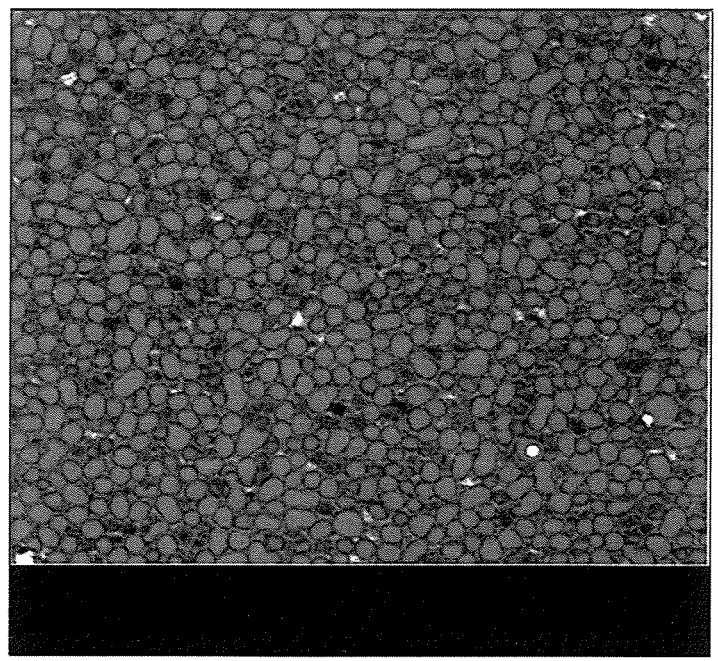
FIG. 11 is a photograph of a cross-section surface of a modified styrene-based resin particle according to an Example 9.
Figure 12:
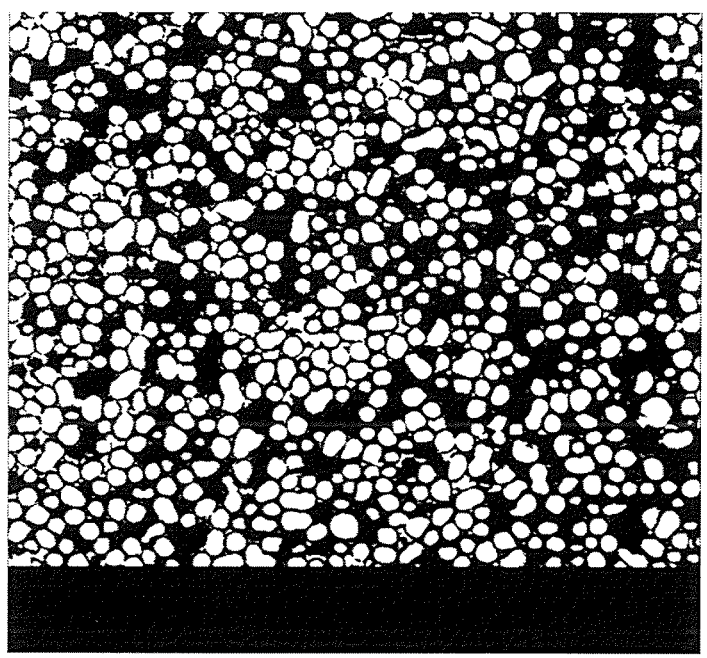
FIG. 12 is a view obtained by performing a binary process to FIG. 11.

FIGS. 11 and 12 are a photograph of the cross-section surface of the modified styrene-based resin particles, and its binarized view (×12800). The average area occupied by the polystyrene-based resin component in the modified styrene-based resin particles was 46.3 µm$^2$. The particles had a structure made of particles of the polystyrene-based resin, and the average particle diameter was 0.45 µm.

b) to d) Reduction of Odor to Expansion Molding

The processes after the process a) were executed in the same manner as in Example 1.

The average odor strength of the expanded molded article was 2.7.

Table 2 shows the results of various measurements.

Example 10 a) Production of Modified Styrene-Based Resin Particles of Polypropylene-Based Resin (PP)/Polystyrene-Based Resin (PS)=40/60

100 parts by weight of (trade name: "F-744NP" by Primepolymer Corporation, melting point: 140° C., melt flow rate: 7.0 g/10 minutes) serving as the polypropylene-based resin was fed to an extruder so be fused and mixed to perform a granulation with an underwater cut process, whereby polypropylene-based resin particles having an elliptic shape (egg shape) (polyolefin-based resin particles) were prepared. The average weight of the polypropylene-based resin particles was 0.8 mg.

Next, 400 g of magnesium pyrrolinate, and 10 g of sodium dodecylbenzenesulfonate were dispersed into 40 kg of water in a 100 L autoclave with an agitator, to prepare a dispersion medium.

16 kg of the synthetic polypropylene-based resin particles were dispersed into the dispersion medium so as to prepare a suspension.

16 g of dicumyl peroxide serving as the polymerization initiator was dissolved into 8.0 kg of styrene monomer to prepare a first styrene-based monomer.

The temperature of the suspension containing the polypropylene resin particles was adjusted to be 60° C., and the first styrene-based monomer was added for 30 minutes in a constant rate. The resultant was then stirred for 1 hour in order to impregnate the first styrene-based monomer into the polypropylene-based resin particles.

Then, the temperature of the reaction system was raised to 140° C., which was equal to the melting point of the polypropylene-based resin, and the resultant was held for 2 hours with this state, whereby the styrene monomer was polymerized (first polymerization) into the polypropylene-based resin particles.

Next, the temperature of the reaction system was decreased to 120° C., and a second styrene-based monomer obtained by dissolving 72 g of dicumyl peroxide serving as the polymerization initiator into 16 kg of styrene monomer was continuously added dropwise at a ratio of 4 kg per 1 hour, whereby the second styrene-based monomer was polymerized (second polymerization) into the polypropylene-based resin particles as being impregnated therein.

After the dropwise addition was ended, the resultant was retained at 120° C. for 1 hour, and then, the temperature of the resultant was raised to 143° C. The resultant was retained for 3 hours with this state so as to complete the polymerization, whereby the modified styrene-based resin particles were prepared.

The softening temperature of the obtained modified styrene-based resin particles was 126° C.

Figure 13:
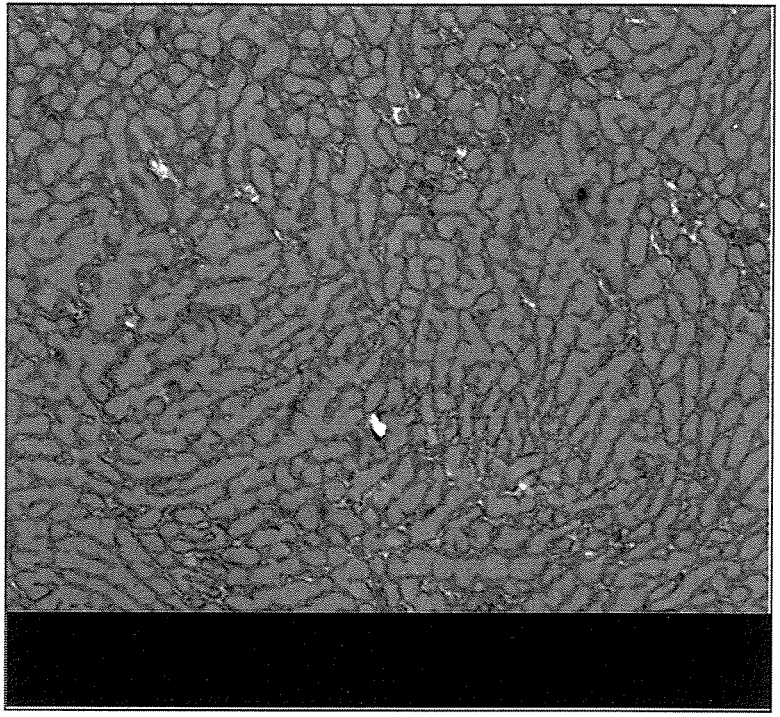
FIG. 13 is a photograph of a cross-section surface of a modified styrene-based resin particle according to an Example 10.
Figure 14:
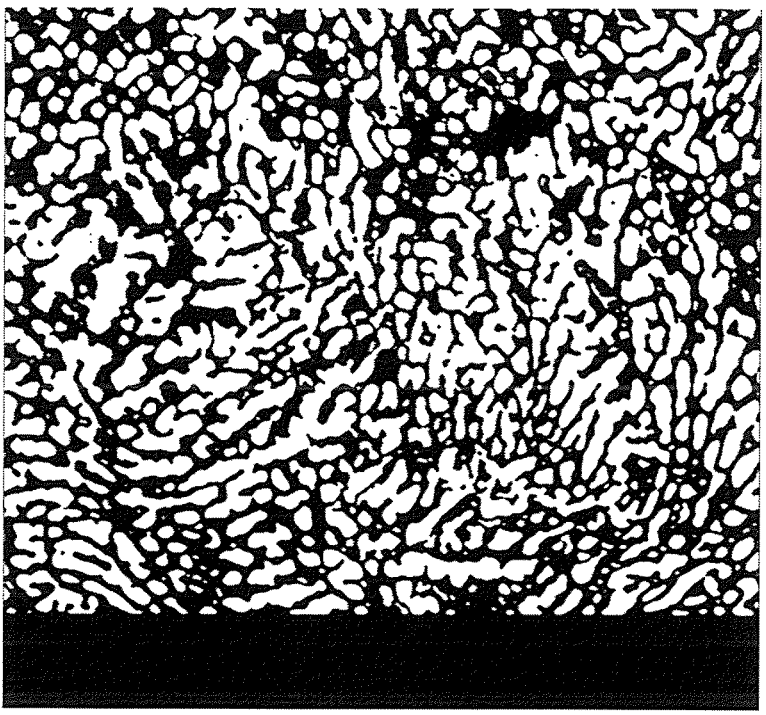
FIG. 14 is a view obtained by performing a binary process to FIG. 13.

FIGS. 13 and 14 are a photograph of the cross-section surface of the modified styrene-based resin particles, and its binarized view (×12800). The average area occupied by the polystyrene-based resin component in the modified styrene-based resin particles was 52.8 µm². The particles had a co-continuous structure in which a band made of the polystyrene-based resin was continuous, and the average width of the band was 0.4 µm.

b) Reduction of Odor

Subsequently, 18 kg of the modified styrene-based resin particles prepared by the process described above were put into an apparatus, that was a fluidized-bed dryer (model: FB-0.5) manufactured by Okawara Mfg. Co., Ltd., in which a gas (air) having a temperature of 92° C. that was lower than the softening temperature T° C. of the modified styrene-based resin particles by 34° C. was blown up at a rate of 1.3 m/sec. from the bottom part, and were processed for 6 hours in order to reduce odor.

Then, the temperature was cooled to a room temperature, and the modified styrene-based resin particles were taken out from the fluid-bed dryer, whereby the modified styrene-based resin particles having the reduced odor were prepared.

c) Pre-Expanding

Subsequently, 2 kg of the modified styrene-based resin particles, and 2 L of water were fed into the autoclave with an agitator, and 15 parts by weight of butane (n-butane:i-butane=7:3) was injected therein as a blowing agent at room temperature. After the injection, the temperature in the autoclave was raised to 70° C., and the stirring was continued for 4 hours.

Thereafter, the temperature was cooled to room temperature, and the resultant was taken out from the 5 L autoclave. The resultant was then dewatered and dried, whereby the expandable resin particles were prepared.

The obtained expandable resin particles were immediately fed to a pre-expanding machine (trade name: "PSX40" manufactured by Kasahara Industries Co., Ltd.), so as to be pre-expanded by using steam having a pressure of 0.15 MPa. Thus, pre-expanded particles having a bulk density of 0.033 g/cm³ were prepared.

d) Expansion Molding

Then, the pre-expanded particles were left to stand for 7 days at room temperature, and then, filled in a mold of a molding machine. Steam was supplied into the mold so as to expand the pre-expanded particles, whereby an expanded molded article was produced in which a density of a rectangular parallelepiped of 400 mm in length×300 mm in width×30 mm in height was 0.033 g/cm³. A fusion rate and appearance of the obtained expanded molded article were both satisfactory.

When the expanded molded article obtained as described above was subject to the odor test, the average odor strength was 2.2.

Table 2 shows the results of various measurements.

Example 11

An expanded molded article having a reduced odor was prepared in the same manner as in Example 10, except that, in order to reduce the odor, a fluidized-bed dryer (model: FB-0.5) manufactured by Okawara Mfg. Co., Ltd. was used, and 18 kg of modified styrene-based resin particles were put into the dryer in which a gas (air) having a temperature of 100° C. that was lower than the softening temperature T° C. of the modified styrene-based resin particles by 26° C. was blown up at a rate of 1.3 m/sec. from the bottom part, and were processed for 6 hours in order to reduce odor. When the expanded molded article obtained as described above was subject to the odor test, the average odor strength was 1.6.

Table 2 shows the results of various measurements.

Comparative Example 1

An expanded molded article was produced as in Example 1, except that the modified polystyrene-based resin particles prepared in Example 1 were not subject to odor reducing process. When the expanded molded article obtained as described above was subject to the odor test, the average odor strength was 3.8.

Table 3 shows the results of various measurements.

Comparative Example 2

An expanded molded article was produced as in Example 2, except that the processed amount was set to 9 kg, the processing temperature was set to 60° C., the rate of the blown gas was set to 1 m/sec., and the processing time was set to 12 hours. When the expanded molded article obtained as described above was subject to the odor test, the average odor strength was 3.3.

Table 3 shows the results of various measurements.

Comparative Example 3

The reduction of the odor was attempted as in Example 4, except that the processing temperature was set to 97° C., and the rate of the blown gas was set to 1.6 m/sec, but the resin particles were bonded during the process, since the processing temperature was too high with respect to the softening temperature of the modified styrene-based resin particles. Accordingly, the process could not be continued.

Table 3 shows the results of various measurements.

Comparative Example 4 a) Production of Modified Styrene-Based Resin Particles of Polyethylene-Based Resin (PE)/Polystyrene-Based Resin (PS)=15/85

100 parts by weight of LLDPE (trade name: "NF-464A" by Japan Polyethylene Corporation, melting point: 124° C., melt flow rate: 2 g/10 minutes) serving as the polyethylene-based resin, and 0.5 part by weight of synthetic hydrous silicon dioxide were fed to an extruder so as to be fused and mixed to perform a granulation with an underwater cut process, whereby LLDPE resin particles having an elliptic shape (egg shape) (polyethylene-based resin particles) were prepared. The average weight of the LLDPE resin particles was 0.6 mg.

Next, 128 g of magnesium pyrrolinate, and 32 g of sodium dodecylbenzenesulfonate were dispersed into 40 kg of water, to prepare a dispersion medium.

6 kg of the LLDPE resin particles containing the synthetic hydrous silicon dioxide were dispersed into the dispersion medium so as to prepare a suspension.

5.7 g of t-butylperoxy benzoate serving as the polymerization initiator was dissolved into 3 kg of styrene monomer to prepare a first styrene-based monomer.

The temperature of the suspension containing the LLDPE resin particles was adjusted to be 60° C., and the first styrene-based monomer was added for 30 minutes in a constant rate. The resultant was then stirred for 1 hour in order to impregnate the first styrene-based monomer into the LLDPE resin particles.

Then, the temperature of the reaction system was raised to 135° C., which was higher than the melting point of the LLDPE by 11° C., and the resultant was held for 3 hours with this state, whereby the styrene monomer was polymerized (first polymerization) into the LLDPE resin particles.

Next, the temperature of the reaction system was decreased to 115° C., and a second styrene-based monomer obtained by dissolving 58.9 g of t-butylperoxy benzoate serving as the polymerization initiator into 31 kg of styrene monomer was continuously added dropwise at a ratio of 4.6 kg per 1 hour, whereby the second styrene-based monomer was polymerized (second polymerization) into the LLDPE resin particles as being impregnated therein.

After the dropwise addition was ended, the resultant was retained at 115° C. for 1 hour, and then, the temperature of the resultant was raised to 140° C. The resultant was retained with this state for 3 hours so as to complete the polymerization, whereby the modified styrene-based resin particles were prepared.

The softening temperature of the obtained modified styrene-based resin particles was 107° C.

Figure 15:
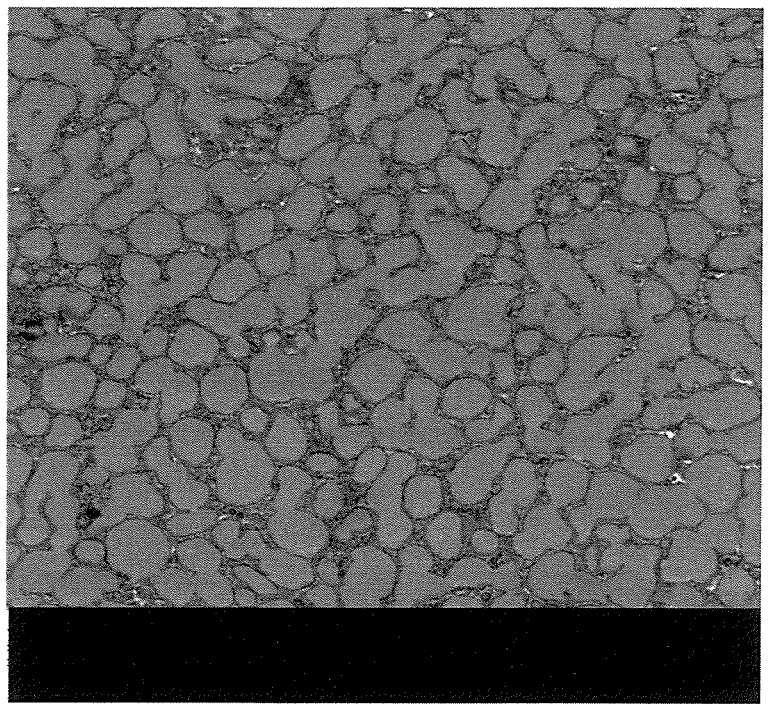
FIG. 15 is a photograph of a cross-section surface of a modified styrene-based resin particle according to a Comparative Example 4.
Figure 16:
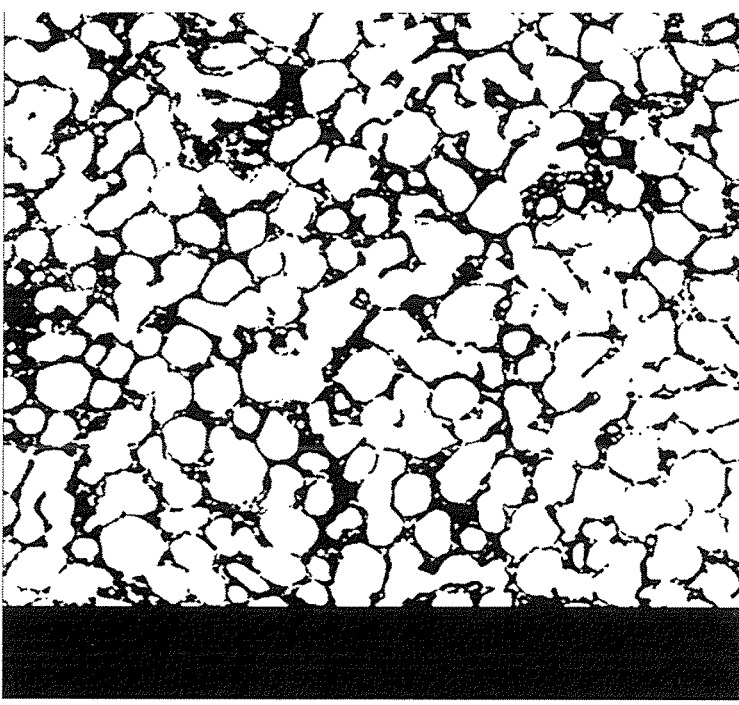
FIG. 16 is a view obtained by performing a binary process to FIG. 15.

FIGS. 15 and 16 are a photograph of the cross-section surface of the modified styrene-based resin particles, and its binarized view (×12800). The average area occupied by the polystyrene-based resin component in the modified styrene-based resin particles was 82.0 µm². The particles had a structure in which distorted polystyrene-based resin particles were dispersed, and the average particle diameter was 1.8 µm. This structure could not sufficiently reduce the volatile portions.

b) to d) Reduction of Odor to Expansion Molding

The processes after the process a) were executed in the same manner as in Example 1.

The average odor strength of the expanded molded article was 3.2.

Table 3 shows the results of various measurements.

Comparative Example 5

Modified styrene-based resin particles of polyethylene-based resin (PE)/polystyrene-based resin (PS)=55/45 were prepared. However, expandability was poor, and the blowing agent was rapidly dissipated and lost after the expanding, with the result that a molded body having a desired density could not be produced.

Table 3 shows the results of various measurements.

Comparative Example 6

An expanded molded article was produced as in Example 10, except that the modified polystyrene-based resin particles prepared in Example 10 were not subject to odor reducing process. When the expanded molded article obtained as described above was subject to the odor test, the average odor strength was 3.8.

Table 3 shows the results of various measurements.

Comparative Example 7

An expanded molded article was produced as in Example 10, except that the processing temperature was set to 85° C. When the expanded molded article obtained as described above was subject to the odor test, the average odor strength was 3.2.

Table 3 shows the results of various measurements.

Comparative Example 8

An expanded molded article was produced as in Example 10, except that the processing temperature was set to 120° C. The reduction of the odor was attempted, but the resin particles were bonded during the process, since the processing temperature was too high with respect to the softening temperature of the modified styrene-based resin particles. Accordingly, the process could not be continued.

Table 3 shows the results of various measurements.

Comparative Example 9

Modified styrene-based resin particles and an expanded molded article were produced as in Comparative Example 8, except that the temperature of the reaction system was decreased to 110° C., and t-butylperoxy benzoate was used as the polymerization initiator, after the first polymerization.

The average odor strength of the expanded molded article was 3.1.

Figure 17:
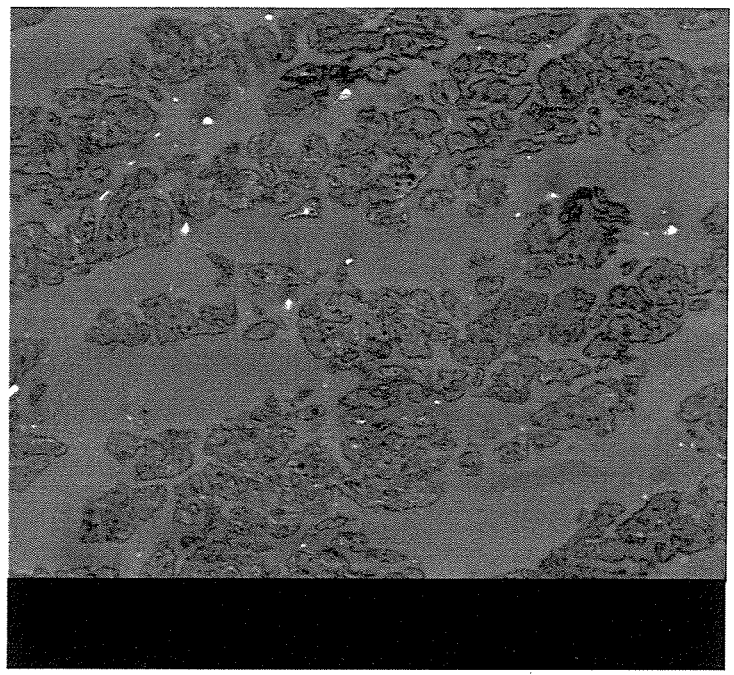
FIG. 17 is a photograph of a cross-section surface of a modified styrene-based resin particle according to a Comparative Example 9.
Figure 18:
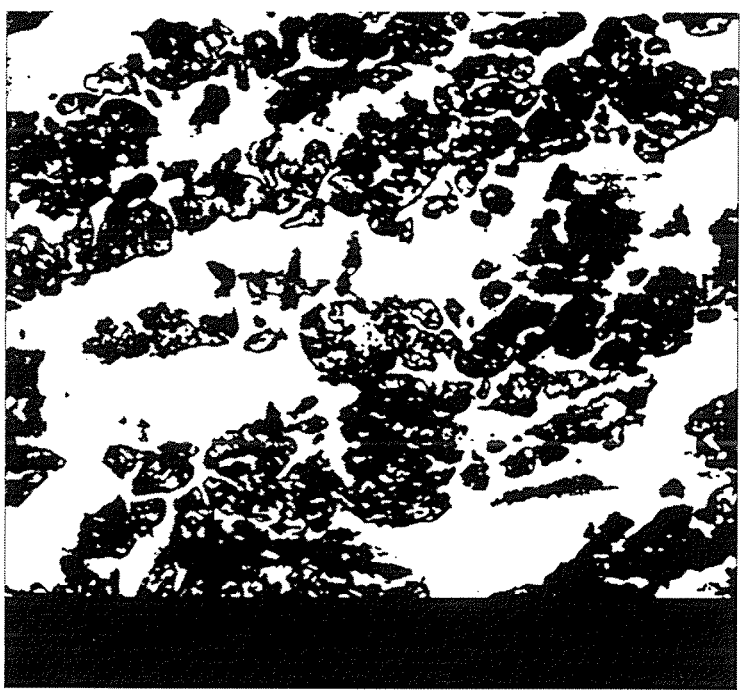
FIG. 18 is a view obtained by performing a binary process to FIG. 17.

FIGS. 17 and 18 are a photograph of the cross-section surface of the modified styrene-based resin particles, and its binarized view (×12800). The average area occupied by the polystyrene-based resin component in the modified styrene-based resin particles was 57.7 µm². The polystyrene-based resin had a structure in which the particles were present in a wide band, and the average width of the band was 2.1 µm. This structure could not sufficiently reduce the odor.

Table 3 shows the results of various measurements.

TABLE 2

| Example | 1 | 2 | 3 | 4 | 5 | 6 | 7 | 8 | 9 | 10 | 11 |
|---|---|---|---|---|---|---|---|---|---|---|---|
| Type of resin | EVA/PS | EVA/PS | EVA/PS | EVA/PS | EVA/PS | EVA/PS | EVA/PS | LLDPE/PS | LLDPE/PS | PP/PS | PP/PS |
| PS amount (part by weight) to 100 parts by weight | 150 | 100 | 233 | 150 | 150 | 150 | 150 | 400 | 233 | 150 | 150 |

TABLE 2-continued

| Example | 1 | 2 | 3 | 4 | 5 | 6 | 7 | 8 | 9 | 10 | 11 |
|---|---|---|---|---|---|---|---|---|---|---|---|
| Ratio (ratio by weight) | 40/60 | 50/50 | 30/70 | 40/60 | 40/60 | 40/60 | 40/60 | 20/80 | 30/70 | 40/60 | 40/60 |
| Structure | Co-continuous | Co-continuous | Co-continuous | Co-continuous | Co-continuous | Co-continuous | Granular | Granular | Granular | Co-continuous | Co-continuous |
| Average area ($\mu m^2$) | 49.2 | 41.9 | 56.0 | 49.2 | 49.2 | 49.2 | 52.3 | 66.3 | 46.3 | 52.8 | 52.8 |
| Width or particle diameter ($\mu m$) | 0.5 | 0.4 | 0.6 | 0.5 | 0.5 | 0.5 | 0.65 | 1.25 | 0.45 | 0.4 | 0.4 |
| Softening temperature (° C.) | 105 | 103 | 107 | 105 | 105 | 105 | 105 | 107 | 107 | 126 | 126 |
| Processing temperature (° C.) | 92 | 92 | 92 | 90 | 92 | 80 | 92 | 92 | 92 | 92 | 100 |
| Grating area ($m^2$) | 0.3 | 0.3 | 0.3 | 0.05 | 0.3 | 0.05 | 0.3 | 0.05 | 0.05 | 005 | 0.05 |
| Height (mm) | 600 | 600 | 600 | 600 | 600 | 600 | 600 | 600 | 600 | 600 | 600 |
| Air flow rate (m/s) | 1.1 | 1.1 | 1.1 | 1.2 | 1.1 | 1.2 | 1.1 | 1.2 | 1.2 | 1.3 | 1.3 |
| Pressure loss (kPa) | 2.8 | 2.8 | 2.8 | 3.0 | 2.8 | 3.0 | 2.8 | 3.1 | 3.1 | 3.0 | 3.0 |
| Processing time (hr) | 6 | 6 | 6 | 9 | 3 | 12 | 6 | 6 | 6 | 6 | 6 |
| Density (g/cm³) | 0.033 | 0.033 | 0.033 | 0.033 | 0.033 | 0.033 | 0.033 | 0.033 | 0.033 | 0.033 | 0.033 |
| Odor determination | 2.4 | 2.2 | 2.5 | 2.6 | 3.0 | 3.0 | 2.0 | 2.8 | 2.7 | 2.2 | 1.6 |

TABLE 3

| Comparative example | 1 | 2 | 3 | 4 | 5 | 6 | 7 | 8 | 9 |
|---|---|---|---|---|---|---|---|---|---|
| Type of resin | EVA/PS | EVA/PS | EVA/PS | LLDPE/PS | EVA/PS | PP/PS | PP/PS | PP/PS | PP/PS |
| PS amount (part by weight) to 100 parts by weight | 150 | 150 | 150 | 550 | 80 | 150 | 150 | 150 | 150 |
| Ratio (ratio by weight) | 40/60 | 40/60 | 40/60 | 15/85 | 55/45 | 40/60 | 40/60 | 40/60 | 40/60 |
| Structure | Co-continuous | Co-continuous | Co-continuous | Deformed | — | Co-continuous | Co-continuous | Co-continuous | Deformed |
| Average area ($\mu m^2$) | 49.2 | 49.2 | 49.2 | 82.0 | — | 52.8 | 52.8 | 52.8 | 57.7 |
| Width or particle diameter ($\mu m$) | 0.5 | 0.5 | 0.5 | 1.8 | — | 0.4 | 0.4 | 0.4 | 2.1 |
| Softening temperature (° C.) | 105 | 105 | 105 | 107 | — | 126 | 126 | 126 | 126 |
| Processing temperature (° C.) | — | 65 | 97 | 92 | — | — | 85 | 120 | 120 |
| Grating area ($m^2$) | — | 0.05 | 0.05 | 0.05 | — | — | 0.05 | 0.05 | 0.05 |
| Height (mm) | — | 300 | 600 | 600 | — | — | 600 | 600 | 600 |
| Air flow rate (m/s) | — | 1.0 | 1.6 | 1.2 | — | — | 1.3 | 1.3 | 1.3 |
| Pressure loss (kPa) | — | 2.0 | 3.0 | 3.1 | — | — | 3.0 | 3.0 | 3.0 |
| Processing time (hr) | — | 12 | — | 6 | — | — | 6 | — | 6 |
| Density (g/cm³) | 0.033 | 0.033 | — | 0.033 | — | 0.033 | 0.033 | — | 0.033 |
| Odor determination | 3.8 | 3.3 | — | 3.2 | — | 3.8 | 3.2 | — | 3.1 |

It is found from Examples 1 to 11 and Comparative Examples 1 to 9 that, when the composite resin particles were fluidized as the gas having a temperature of (T−34) to (T−13)° C. is blown from the bottom part of the container in case where the softening temperature of the composite resin particle is defined as T° C., the odor contained in the composite resin particles can efficiently be reduced within 12 hours, and hence, an expanded molded article having odor content percentage in a low level (3 or less of the odor strength) can be formed from the composite resin particles.

What is claimed is:

1. A method of reducing an odor of composite resin particles comprising:

fluidizing the composite resin particles, which contain a polyolefin-based resin and a polystyrene-based resin and which are used for producing an expanded molded article, in a container with a gas that is blown thereinto from its bottom and that has a temperature of (T−40)° C. to (T−10)° C. (T is a softening temperature of the composite resin particles), to reduce the odor generated from a raw material of the composite resin particles and generated according to a method of the composite resin particles, wherein the composite resin particles whose odor is reduced are impregnated with a blowing agent; and the resultant is pre-expanded and then subject to an in-mold forming to make the expanded molded article have an odor strength of 3 or less in average value in odor test in which odor of an isovaleric acid diluted 100000 times is defined as 3, which means a reference odor, within 0 to 5 levels of the odor strength.

2. A method of reducing an odor of composite resin particles according to claim 1, wherein the polyolefin-based resin is a polyethylene-based resin, and the gas is blown at a temperature of (T−30)° C. to (T−10)° C.

3. A method of reducing an odor of composite resin particles according to claim 1, wherein the polyolefin-based resin is a polypropylene-based resin, and the gas is blown at a temperature of (T−40)° C. to (T−15)° C.

4. A method of reducing an odor of composite resin particles according to claim 1, wherein the composite resin particles are put into the container with the gas being blown from a bottom part of the container.

5. A method of reducing an odor of composite resin particles according to claim 1, wherein the composite resin particles contain 100 parts by weight of the polyolefin-based resin and 100 to 500 parts by weight of the polystyrene-based resin.

6. A method of reducing an odor of composite resin particles according to claim 1, wherein the composite resin particles are polyolefin-modified styrene-based resin particles that are obtained by impregnating a styrene-based monomer into the polyolefin-based resin particles and performing a polymerization.

7. A method of reducing an odor of composite resin particles according to claim 1, wherein the odor is derived from a polymerization initiator used for producing a polystyrene-based resin forming the composite resin.

8. Composite resin particles having reduced odor and produced by the method of claim 1.

9. Composite resin particles comprising, for producing an expanded molded article, the composite resin particles containing 100 parts by weight of a polyolefin-based resin and 100 to 500 parts by weight of a polystyrene-based resin, wherein the composite resin particles:
(1) have a co-continuous structure or a granular dispersion structure in which an average area occupied by the polystyrene-based resin is 35 to 80 μm$^2$ in a TEM photograph obtained by photographing a portion of 10 μm×10 μm of a cross-section surface at its central part with a magnification of 12800; and
(2) are impregnated with a blowing agent; and the resultant is pre-expanded and then subject to an in-mold forming to make the expanded molded article have an odor strength of 3 or less in average value in odor test in which odor of an isovaleric acid diluted 100000 times is defined as 3, which means a reference odor, within 0 to 5 levels of the odor strength.

10. Composite resin particles according to claim 9, wherein the composite resin particles have a co-continuous structure in which a band made of a polystyrene-based resin having an average width of 0.2 to 1.5 μm is continuous, or a granular dispersion structure having a granular polystyrene-based resin of 0.01 to 1.5 μm.

11. Expandable composite resin particles formed by impregnating a blowing agent into the composite resin particles of claim 8.

12. Pre-expanded particles formed by pre-expanding the expandable composite resin particles of claim 11.

13. An expanded molded article produced by allowing the pre-expanded particles of claim 12 to be subject to an in-mold forming, wherein an average value of an odor strength in the odor test is 3 or less.

14. An automobile interior material derived from the expanded molded article of claim 13.

15. Expandable composite resin particles formed by impregnating a blowing agent into the composite resin particles of claims 9.

16. Pre-expanded particles formed by pre-expanding the expandable composite resin particles of claim 15.

17. An expanded molded article produced by allowing the pre-expanded particles of claim 16 to be subject to an in-mold forming, wherein an average value of an odor strength in the odor test is 3 or less.

18. An automobile interior material derived from the expanded molded article of claim 17.

* * * * *